(12) United States Patent
Alli et al.

(10) Patent No.: US 11,125,916 B2
(45) Date of Patent: *Sep. 21, 2021

(54) SILICONE HYDROGELS COMPRISING N-ALKYL METHACRYLAMIDES AND CONTACT LENSES MADE THEREOF

(71) Applicant: Johnson & Johnson Vision Care, Inc., Jacksonville, FL (US)

(72) Inventors: Azaam Alli, Jacksonville, FL (US); Dola Sinha, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 474 days.

This patent is subject to a terminal disclaimer.

(21) Appl. No.: 15/609,088

(22) Filed: May 31, 2017

(65) Prior Publication Data

US 2018/0011223 A1    Jan. 11, 2018

Related U.S. Application Data

(60) Provisional application No. 62/358,967, filed on Jul. 6, 2016.

(51) Int. Cl.
*G02B 1/04* (2006.01)
*C08F 283/12* (2006.01)
(Continued)

(52) U.S. Cl.
CPC ........ *G02B 1/043* (2013.01); *B29D 11/00048* (2013.01); *C08F 283/122* (2013.01);
(Continued)

(58) Field of Classification Search
None
See application file for complete search history.

(56) References Cited

U.S. PATENT DOCUMENTS 3,408,429 A    10/1968 Wichterle
3,660,545 A    5/1972 Wichterle
(Continued)

FOREIGN PATENT DOCUMENTS

CN    1936648 A    3/2007
CN    101076752 A    11/2007
(Continued)

OTHER PUBLICATIONS

Anonymous: "List of soft contact lens materials—Wikipedia", Wikipedia, Jul. 14, 2017 (Jul. 14, 2017), XP055405881, Retrieved from the Internet: URL:https://en.wikipedia.org/wiki/List_of_soft contact lens materials.
(Continued)

*Primary Examiner* — Rachel Kahn
*Assistant Examiner* — Ha S Nguyen
(74) *Attorney, Agent, or Firm* — Raef M. Shaltout

(57) ABSTRACT

The present invention relates to silicone hydrogels exhibiting desired combinations of physical and mechanical properties, formed from a reactive monomer mixture comprising at least one N-alkyl methacrylamide, and at least one silicone-containing component. These silicone hydrogels may also contain hydrophilic components, crosslinking agents and toughening monomers. These silicone hydrogels are useful in preparing biomedical devices, ophthalmic lenses, and contact lenses.

17 Claims, 1 Drawing Sheet

(51) Int. Cl.

| | | |
|---|---|---|
| *C08J 3/075* | (2006.01) | |
| *C08F 290/06* | (2006.01) | |
| *G02C 7/04* | (2006.01) | |
| *B29D 11/00* | (2006.01) | |
| *C08G 77/52* | (2006.01) | |
| *C08L 83/14* | (2006.01) | |
| *B29K 83/00* | (2006.01) | |
| *B29K 105/00* | (2006.01) | |
| *C08F 220/56* | (2006.01) | |
| *C08L 33/26* | (2006.01) | |
| *C08L 51/08* | (2006.01) | |
| *C08L 101/12* | (2006.01) | |

(52) U.S. Cl.
CPC .......... *C08F 290/068* (2013.01); *C08G 77/52* (2013.01); *C08J 3/075* (2013.01); *C08L 83/14* (2013.01); *G02C 7/049* (2013.01); *B29K 2083/00* (2013.01); *B29K 2105/0061* (2013.01); *C08G 2210/00* (2013.01); *C08J 2383/04* (2013.01); *C08J 2383/08* (2013.01); *C08L 2205/025* (2013.01); *C08L 2205/025* (2013.01)

(56) References Cited

U.S. PATENT DOCUMENTS

| | | |
|---|---|---|
| 3,808,178 A | 4/1974 | Gaylord |
| 3,944,347 A | 3/1976 | Barkdoll et al. |
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,166,255 A | 8/1979 | Graham |
| 4,182,822 A | 1/1980 | Chang |
| 4,197,266 A | 4/1980 | Clark et al. |
| 4,208,362 A | 6/1980 | Deichert et al. |
| 4,343,927 A | 8/1982 | Chang |
| 4,436,887 A | 3/1984 | Chromecek et al. |
| 4,486,577 A * | 12/1984 | Mueller ............... C08F 290/148 525/474 |
| 4,495,313 A | 1/1985 | Larsen |
| 4,659,782 A | 4/1987 | Spinelli |
| 4,659,783 A | 4/1987 | Spinelli |
| 4,666,249 A | 5/1987 | Bauman et al. |
| 4,680,336 A | 7/1987 | Larsen et al. |
| 4,701,288 A | 10/1987 | Cook et al. |
| 4,702,574 A | 10/1987 | Bawa |
| 4,740,533 A | 4/1988 | Su et al. |
| 4,889,664 A | 12/1989 | Kindt-Larsen et al. |
| 4,910,277 A | 3/1990 | Bambury et al. |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,321,108 A | 6/1994 | Kunzler et al. |
| 5,331,067 A | 7/1994 | Seidner et al. |
| 5,371,147 A | 12/1994 | Spinelli et al. |
| 5,387,662 A | 2/1995 | Kunzler et al. |
| 5,539,016 A | 7/1996 | Kunzler et al. |
| 5,753,150 A | 5/1998 | Martin et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,923,397 A | 7/1999 | Bonafini, Jr. |
| 5,944,853 A | 8/1999 | Molock et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,087,415 A | 7/2000 | Vanderlaan et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,579,918 B1 | 6/2003 | Auten et al. |
| 6,610,220 B1 | 8/2003 | Caltrider et al. |
| 6,767,979 B1 | 7/2004 | Muir et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 7,052,131 B2 | 5/2006 | McCabe et al. |
| 7,172,285 B1 | 2/2007 | Altmann et al. |
| 7,247,692 B2 | 7/2007 | Laredo |
| 7,249,848 B2 | 7/2007 | Laredo et al. |
| 7,553,880 B2 | 6/2009 | Nicolson et al. |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,138,290 B2 | 3/2012 | Blackwell et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,405 B2 | 4/2013 | Maggio et al. |
| 8,450,387 B2 | 5/2013 | McCabe et al. |
| 8,470,906 B2 | 6/2013 | Rathore et al. |
| 8,487,058 B2 | 7/2013 | Liu et al. |
| 8,507,577 B2 | 8/2013 | Zanini et al. |
| 8,637,621 B2 | 1/2014 | Iwata et al. |
| 8,662,663 B2 | 3/2014 | Matsushita et al. |
| 8,703,891 B2 | 4/2014 | Broad |
| 8,772,367 B2 | 7/2014 | Saxena et al. |
| 8,772,422 B2 | 7/2014 | Saxena et al. |
| 8,937,110 B2 | 1/2015 | Alli et al. |
| 8,937,111 B2 | 1/2015 | Alli et al. |
| 8,940,812 B2 | 1/2015 | Reboul et al. |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 2002/0000680 A1 | 1/2002 | Altmann et al. |
| 2002/0016383 A1 | 2/2002 | Iwata et al. |
| 2002/0107337 A1* | 8/2002 | Rosenzweig ......... C08F 220/56 525/474 |
| 2003/0142267 A1 | 7/2003 | Gemert et al. |
| 2004/0141150 A1 | 7/2004 | Roffman et al. |
| 2005/0018130 A1 | 1/2005 | Dahl et al. |
| 2007/0284770 A1 | 12/2007 | Ansell et al. |
| 2008/0074611 A1 | 3/2008 | Meyers et al. |
| 2008/0245747 A1 | 10/2008 | Kernick et al. |
| 2008/0274207 A1 | 11/2008 | Nayiby et al. |
| 2009/0146329 A1 | 6/2009 | Yin et al. |
| 2010/0014047 A1 | 1/2010 | Chang et al. |
| 2010/0048847 A1 | 2/2010 | Broad |
| 2012/0283353 A1 | 11/2012 | Mahadevan et al. |
| 2013/0056889 A1 | 3/2013 | Jan |
| 2013/0172440 A1* | 7/2013 | Alli ...................... G02B 1/043 523/107 |
| 2013/0258276 A1* | 10/2013 | Hansen ............ B29D 11/00048 351/159.22 |
| 2016/0313571 A1 | 10/2016 | Alli et al. |
| 2019/0121162 A1 | 4/2019 | Alli et al. |

FOREIGN PATENT DOCUMENTS

| | | |
|---|---|---|
| CN | 101078815 A | 11/2007 |
| DE | 2261549 A1 | 6/1974 |

(56) References Cited

FOREIGN PATENT DOCUMENTS

| | | | |
|---|---|---|---|
| EP | 0080539 B1 | 6/1983 | |
| EP | 207640 A2 | 1/1987 | |
| EP | 2639626 A2 | 9/2013 | |
| EP | 2645156 A2 | 10/2013 | |
| JP | 08283342 A | * 10/1996 | ............ C08F 30/08 |
| JP | 08304746 A | * 11/1996 | |
| JP | 2002006269 A | 1/2002 | |
| JP | 2003019720 A | 1/2003 | |
| JP | 2011016272 A | 1/2011 | |
| WO | 9631792 A1 | 10/1996 | |
| WO | 2003022321 A2 | 3/2003 | |
| WO | 2004042453 A1 | 5/2004 | |
| WO | 2005079290 A2 | 9/2005 | |
| WO | 2008061992 A2 | 5/2008 | |
| WO | 2011130138 A1 | 10/2011 | |
| WO | 2013048990 A1 | 4/2013 | |
| WO | 2014004106 A1 | 1/2014 | |
| WO | 2014121030 A2 | 8/2014 | |
| WO | 2014123959 A1 | 8/2014 | |
| WO | 2015153404 A1 | 10/2015 | |

OTHER PUBLICATIONS

Chambers, "ChemIDplus—478799-92-7—Senofilcon A [USAN]-Similar structures search, synonyms, formulas, resource links, and other chemical information.", Jan. 1, 2017 (Jan. 1, 2017), XP055405710, Retrieved from the Internet: URL:https://chem.nlm.nih.gov/chemidplus/rn/478799-92-7.

PCT International Search Report, dated Sep. 20, 2017, for PCT Int'l Appln. No. PCT/US2017/037326.

PCT International Search Report, dated Aug. 30, 2017, for PCT Int'l Appln. No. PCT/US2017/037341.

Chen et al, Copolymerization of Methyl Methacrylate and N-Alkyl Methacrylamide, Journal of Applied Polymer Science, vol. 82, pp. 400-405 (2001).

Chou, The Evolution of Silicone Hydrogel Lenses, Contact Lens Spectrum, Jun. 2008.

Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanomski.

Crivello, et al, Photoinitiators for Free Radical Cationic & Anionic Photopolymerisation, 2nd Edition, vol. III, pp. 275-298, John Wiley and Sons, New York, 1998.

European Search Report (Partial) for corresponding Patent Application No. EP13161165 completed May 17, 2013.

European Search Report dated Oct. 8, 2013 for Application No. EP13161165.

ISO 18369-4:2006: Ophthalmic optics—Contact lenses—Part 4: Physicochemical properties of contact lens materials.

ISO 9913-1: 1996: Optics and optical instruments—Contact Lenses—Part 1: Determination of oxygen permeability and transmissibility by the FATT method.

Kodaira et al, Solvent Effect on the Radical Copolymerization of N-Methyl- and N,N-Dimethylacrylamides in N-Methylmethacrylamide with Methyl Methacrylate, Polymer Journal, vol. 20, No. 11, pp. 1021-1029 (1988).

Kuo et al, Substituent-induced delocalization effects on hydrogen-bonding interaction in poly(N-phenylmethacrylamide) derivatives, Polymer, vol. 52, pp. 2600-2608 (2011).

Kuo et al, Thermal behavior and specific interaction in high glass transition temperature PMMA copolymer, Polymer, vol. 44, pp. 6873-6882 (2003).

Miyake et al, Coordination—Addition Polymerization and Kinetic Resolution of Methacrylamides by Chiral Metallocene Catalysts, Macromolecules, vol. 42, pp. 1462-1471 (2009).

Report issued by the Danish Patent and Trademark Office (Singapore Written Opinion) for Application No. 2013009709 dated Jun. 20, 2014.

Ritter el al, Cyclodextrins in Polymer Synthesis: Two-Step Reaction to Aliphatic Poly(methacrylimide) Foams by Thermal Treatment of Copolymers Obtained from Cyclodextrin Complexes of tert-Butyl Methacrylate and Various N-alkyl Methacrylamides, Macromolecules, vol. 36, pp. 318-322 (2003).

Schrooten et al, Propagation Kinetics of the Radical Polymerization of Methylated Acrylamides in Aqueous Solution, Macromolecular Chemistry and Physics, vol. 214, pp. 2283-2294 (2013).

Shea et al, Synthesis and Characterization of Highly Cross-Linked Polyacrylamides and Polymethacrylamides. A New Class of Macroporous Polyamides, Macromolecules, vol. 23, No. 21, pp. 4497-4507 (1990).

Singapore Search Report for Application No. 201300970-9 dated Oct. 15, 2013.

Sutyagin et al., Chemistry and physics of polymers, Tomsk: TPU Publishing House, 2003, p. 142, (translated).

Sutyagin et al., Chemistry and physics of polymers, Tomsk: TPU Publishing House, 2003, p. 142, 143 (translated).

* cited by examiner

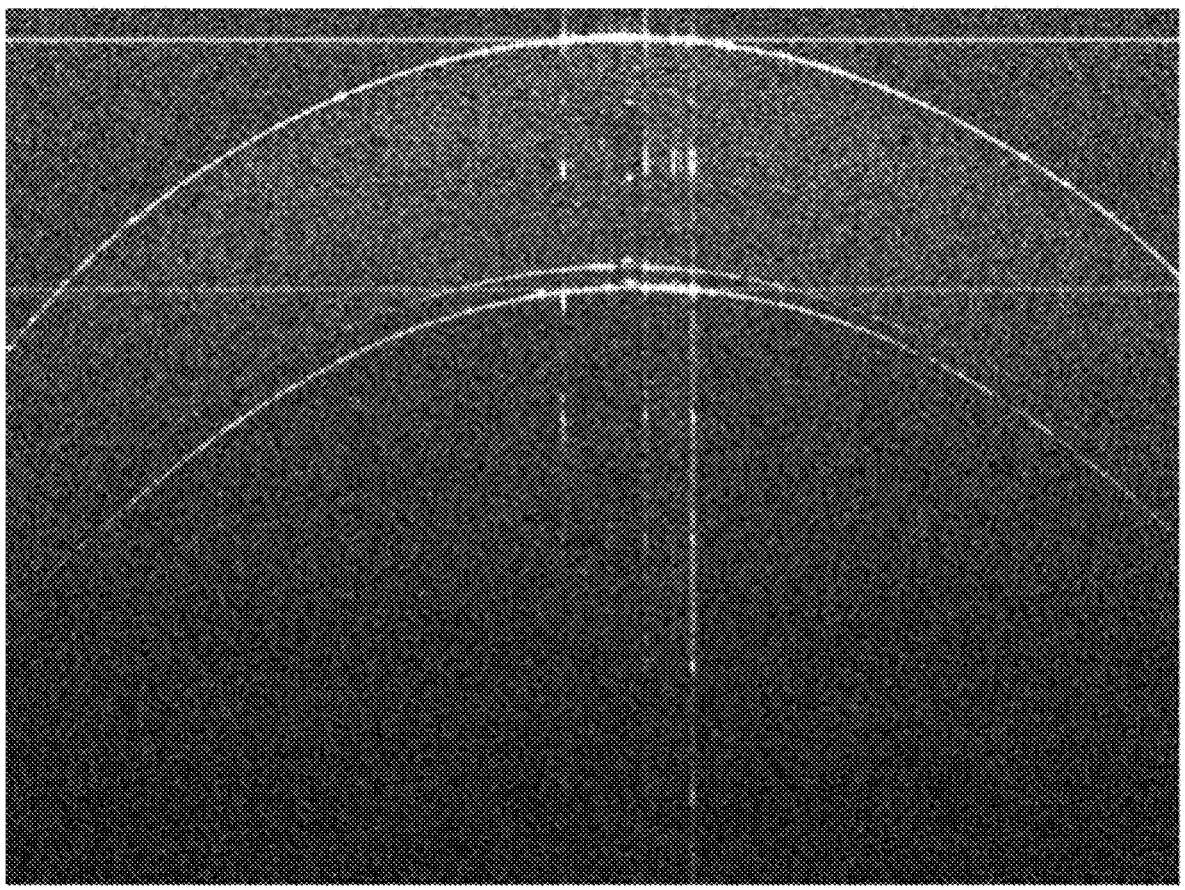

SILICONE HYDROGELS COMPRISING N-ALKYL METHACRYLAMIDES AND CONTACT LENSES MADE THEREOF

RELATED APPLICATIONS

This application claims priority to U.S. Provisional Patent Application No. 62/358,967, filed Jul. 6, 2016, which is incorporated herein by reference in its entirety.

TECHNICAL FIELD

The present invention relates to silicone hydrogels derived from reactive monomer mixtures comprising N-alkyl methacrylamides, and silicone-containing components, and displaying surprising combinations of physical and mechanical properties including modulus. These silicone hydrogels are suitable for use in a number of fields including medical devices, ophthalmic devices, and contact lenses.

BACKGROUND

Soft contact lenses are based upon hydrogels. Many users find soft contact lenses comfortable enough to wear all day. There are two main classes of soft contact lens materials, conventional soft contact lenses which are formed from hydrogels containing no silicone, and silicone hydrogels. Conventional and silicone hydrogels have moduli ranging from about 20 psi to about 300 psi, which allows the lenses to conform to the shape of the eye. These modulus levels can require manufacturers to produce contact lenses having a large number of optical powers and configurations.

Silicone hydrogels generally have higher moduli than conventional hydrogels with values ranging from about 50 psi to about 300 psi. Silicone hydrogel contact lenses displaying moduli greater than about 150 psi may decrease patient comfort and increase certain mechanical adverse events. Nonetheless, even at these higher moduli, silicone hydrogel contact lenses still substantially conform to the shape of the eye requiring a large number of lens designs to fit the patient population.

Toughening agents such as isobornyl methacrylate, methyl methacrylate and crosslinkers are known to increase the modulus of contact lenses. However, they generally detrimentally impact other mechanical properties of the lens such as elongation. U.S. Pat. Nos. 4,182,822 and 4,343,927, disclose silicone hydrogels made from reactive mixtures of amide monomers, including N-alkyl methacrylamides, short chain polysiloxanylalkyl methacrylates, and optionally other monomers. U.S. Pat. No. 5,298,533 discloses that conventional hydrogels (those with no silicone content) prepared from N-methyl methacrylamide are less hydrolytically stable than those made from N, N-dimethyl acrylamide. None of these patents disclose silicone hydrogel formulations with polysiloxane containing components having four or more polysiloxane repeating units or silicone hydrogels having the surprising balance of properties disclosed herein.

Kodaira et al in the Polymer Journal Vol. 20, No. 11, pp 1021-1029 (1988) disclosed the effects of solvent on the copolymer reactivity ratios of N-methyl acrylamide or N-methyl methacrylamide with methyl methacrylate.

Shea et al in Macromolecules Vol. 23, No. 21, pp 4497-4507 (1990) reported the synthesis of highly cross-linked polyacrylamides and polymethacrylamides, including those made from N-methyl methacrylamide and various bis-methacrylamide cross-linking agents. Poly(N-methyl methacrylamide) was also prepared.

Various N-substituted methacrylamides have been used to make a variety of non-hydrogel copolymers, including copolymerization of methyl methacrylate with N-methyl, N-cyclohexyl, and N-isobornyl methacrylamides (Chen et al in the Journal of Polymer Science Vol. 82, pp 400-405 (2001)); copolymerization of tert-butyl methacrylate with N-octyl, N-ethyl, N-cyclohexyl, and N-benzyl methacrylamides, which upon thermal treatment generate substituted poly (methacrylimides) foams (Ritter el al in Macromolecules Vol. 36, pp 318-322 (2003)); the synthesis of homo-polymers from N-phenyl, N-4-methoxyphenyl, and N-4-bromophenyl methacrylamide (Kuo et al in Polymer Vol. 52, pp 2600-2608 (2011)).

Schrooten et al in Macromol. Chem. Phys. Vol. 214, pp 2283-2294 (2013) studied the propagation kinetics of the radical polymerization of N, N-dimethyl acrylamide, N-methylmethacrylamide, and methacrylamide in aqueous solution. The propagation rate coefficients decreased with monomer concentration in part because of concomitant changes in hydrogen bonding and dipole-dipole effects. This reference also disclosed that N, N-dimethyl methacrylamide does not undergo radical homo-polymerization. None of these printed publications from the scientific literature disclosed silicone hydrogels with N-alkyl methacrylamides. Some reported high glass transition temperatures for polymers made from N-alkyl methacrylamides, while others reported on the polymerization kinetics of N-alkyl methacrylamides, highlighting the effects of solvent on reactivity ratios.

U.S. Pat. No. 862,662 discloses hybrid soft contact lenses where both the central and peripheral portions are formed from hydrous, soft materials having Young's modulus between 435 psi and 14,503 psi and between 29 psi and 435 psi, respectively. The hydrous soft materials may be formed from styryl siloxane monomers and hydrophilic monomers, including (meth)acrylamide monomers. However, N-alkyl methacrylamide monomers are not disclosed.

For patients with astigmatism, soft contact lenses must be rotationally stabilized in order for the optical correction to be effective in all head positions. Such stabilization is usually accomplished by the use of stabilization zones on the posterior side of the contact lens that limit rotation. Alternatively, astigmatic masking lenses having a central portion of the lens which vaults over the cornea, thereby creating a space between the corneal surface and the lens, have been developed. Tear film fills that space and masks the astigmatism. Current masking lenses which have sufficient stiffness in the central region are either undesirably thick, or are incompatible with the hydrogel materials used in the periphery.

SUMMARY OF THE INVENTION

The present invention relates to compositions, including silicone hydrogels formed from reactive mixtures comprising, consisting and consisting essentially of a silicon-containing component and at least one N-alkyl methacrylamide monomer.

The present invention relates to silicone hydrogels having a modulus of at least about 1000 psi and a water content of at least about 10%, formed from a reactive mixture comprising at least one N-alkyl methacrylamide and at least one silicone-containing component.

The present invention relates to non-ionic silicone hydrogels having a modulus of about 140 to about 2000 psi and a water content of about 20 to about 50%, formed from a reactive mixture comprising at least one N-alkyl methacrylamide and at least one silicone containing component.

The present invention relates to silicone hydrogels having a modulus of about 150 psi to about 200,000 psi and a water content of about 10 to about 50%, formed from a reactive mixture comprising at least one N-alkyl methacrylamide, about 5 to about 15 wt % at least one crosslinking component, and at least one silicone containing component selected from compounds of Formulae I through V:

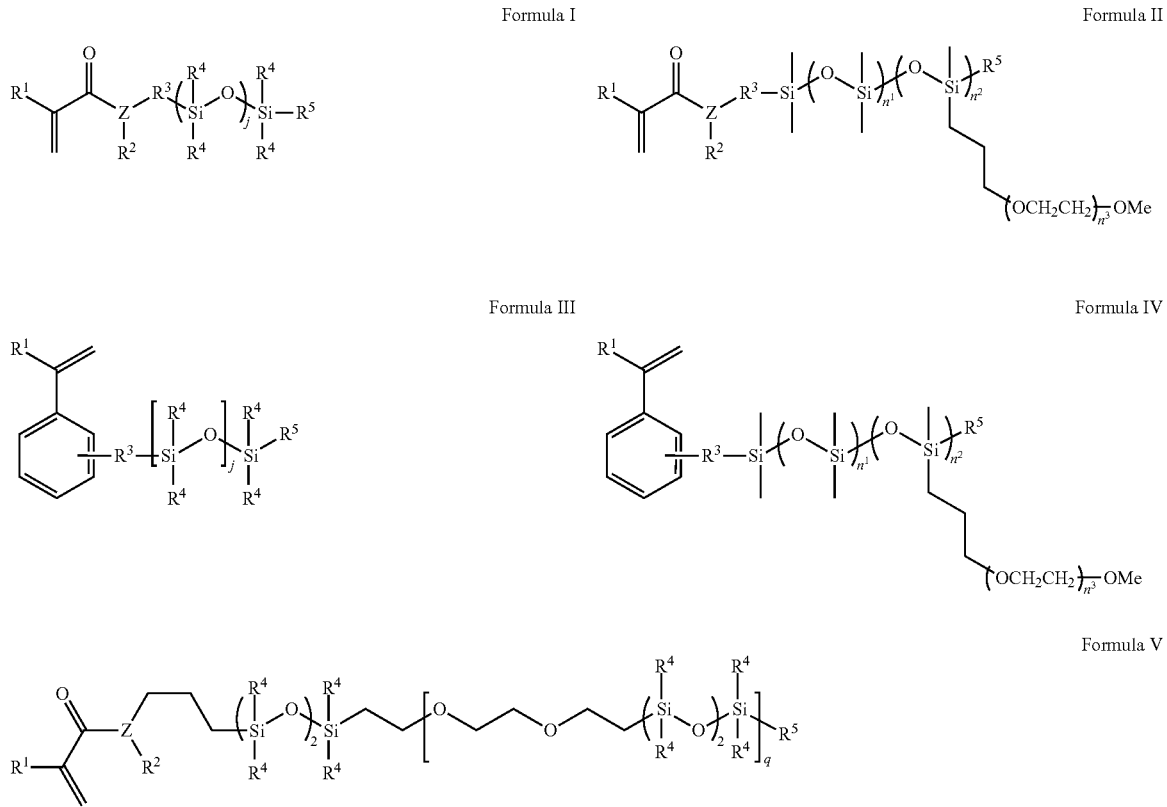

wherein $R^1$ is a hydrogen atom or methyl; Z is selected from O, N, S or $NCH_2CH_2O$; when Z=O or S, $R^2$ is not required; wherein j is a whole number between 1 and 20; q is up to 50, or 5 to 30 or 10-25; and $n^1$ and $n^2$ are between 4 to 100; 4 to 50; or 4 to 25; $n^3$ is 1-50, 1-20, or 1-10;

wherein $R^2$ is H or is a linear, branched, or cyclic alkyl group containing one to eight carbon atoms (or 3 to 8 carbon atoms), any of which may be further substituted with at least one hydroxy group, and which may be optionally substituted with amide, ether, and combinations thereof;

wherein $R^3$ is a substituted or unsubstituted $C_{1-6}$, $C_{1-4}$ or $C_{2-4}$ alkylene segment such as $(CH_2)_r$, wherein each methylene group may optionally be independently substituted with ethers, amines, carbonyls, carboxylates, carbamates and combinations thereof; or an oxyalkylene segment such as $(OCH_2)_k$ and k is a whole number from one to three, or wherein $R^3$ may be a mixture of alkylene and oxyalkylene segments and the sum of r and k is between 1 and 9;

wherein each $R^4$ is independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof;

wherein $R^5$ is a substituted or un-substituted linear or branched alkyl group having 1 to eight carbon atoms, or 1 to 4 carbon atoms, or methyl or butyl; or an aryl group, any of which may be substituted with one or more fluorine atoms.

The present invention relates to silicone hydrogels formed from a reactive mixture comprising at least one N-alkyl methacrylamide, at least one silicone containing component and at least about 2 wt %, or at least 5-15 wt % at least one crosslinking component.

The present invention relates to silicone hydrogels having a modulus of about 20,000 psi to about 200,000 psi and a water content of about 10 to about 40%, formed from a reactive mixture comprising (a) at least one N-alkyl methacrylamide, (b) at least one crosslinking component (c) at least one bulky siloxane-containing component selected from the group consisting of tris(trimethyl siloxy)silyl styrene, 3-tris(trimethylsiloxy)silylpropyl methacrylate, N-[3-tris(trimethylsiloxy)silyl]-propyl acrylamide, 2-hydroxy-3-[3-methyl-3,3-di(trimethyl siloxy)silylpropoxy]-propyl methacrylate, and other bulky silicone monomers, such as those in Formulae VI through XIV, wherein each $R^6$ is independently linear, branched, or cyclic alkyl groups containing between one and eight carbon atoms, or are trimethylsiloxy groups:

Formula VI

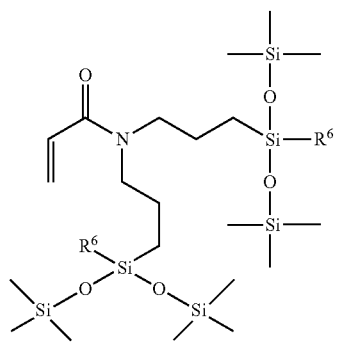

Formula VII

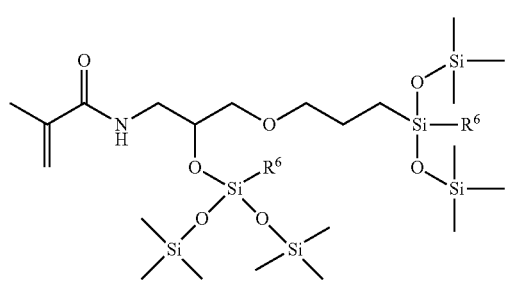

Formula VIII

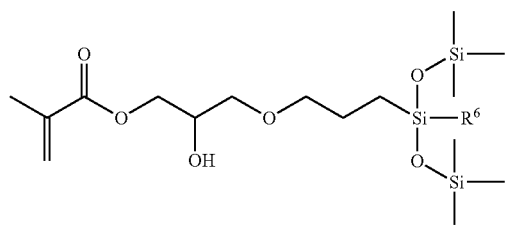

Formula IX

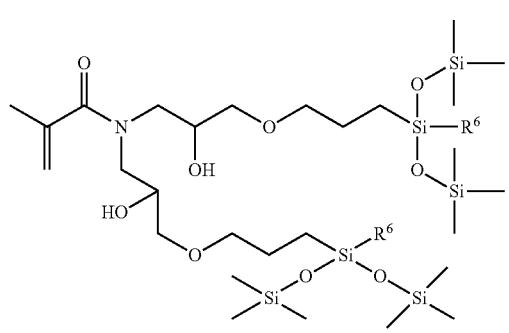

Formula X

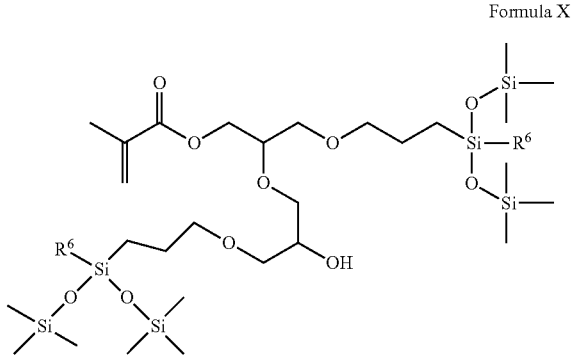

Formula XI

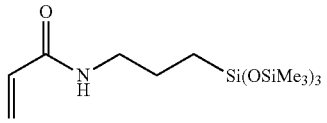

Formula XII

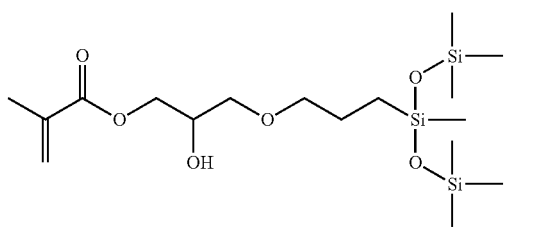

Formula XIII

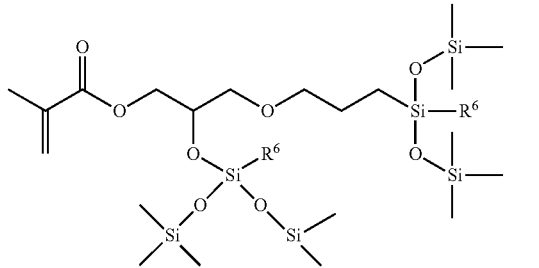

Formula XIV

The present invention relates to silicone hydrogels formed from a reactive mixture comprising
  a) at least one N-alkyl methacrylamide;
  b) at least one hydroxyl-containing silicone containing component;
  c) at least one wetting agent;
  d) at least one hydroxyalkyl monomer, and
  e) at least one cross-linking agent.

The present invention relates to composite contact lenses comprising a central region and a peripheral region wherein the central region comprises a first silicone hydrogel formed from a reaction mixture comprising at least one N-alkyl methacrylamide and at least one silicone-containing component and the peripheral region comprising a second silicone hydrogel exhibiting a lower modulus than the central region.

The present invention relates to processes for making a composite contact lens, comprising:
  (a) dosing into a first mold a first silicone hydrogel formulation hydrogel formed from a reaction mixture comprising at least one N-alkyl methacrylamide and at least one silicone-containing components,
  (b) partially curing the first silicone hydrogel formulation into a gel,
  (c) dosing a second silicone hydrogel formulation into the first mold (d) allowing time for the second silicone hydrogel formulation to imbibe into the gel,
(e) placing a second mold on top of the first mold, and
(f) fully curing the combination to form the composite contact lens.

DESCRIPTION OF THE DRAWINGS

FIG. 1 is a micrograph of a composite lens prepared according to Example 57 showing the vaulting gap between the contact lens and the artificial corneal surface.

DETAILED DESCRIPTION

It is to be understood that the invention is not limited to the details of construction or process steps set forth in the following description. The invention is capable of other embodiments and of being practiced or being carried out in various ways using the teaching herein.

It has been found that silicone hydrogels formed by polymerizing N-alkyl methacrylamides with at least one silicone-containing component and additional optional components including cross-linking agents, hydrophilic monomers, wetting agents, and toughening agents provide silicone hydrogels which display surprising combinations of properties, including high moduli at desirable water contents. This balance of properties is particularly surprising as the same effects are not seen in formulations where structurally similar amides such as acrylamides, such as N,N-dimethlyacrylamide, methacrylamide or methacrylamides where both N substituents are either H or alkyl are used with the silicone-containing component(s).

With respect to the terms used in this disclosure, the following definitions are provided. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski.

As used herein, the term "about" refers to a range of +/−5% of the number that is being modified. For example, the phrase "about 10" would include both 9.5 and 10.5.

The term "(meth)" designates optional methyl substitution. Thus, a term such as "(meth)acrylate" denotes both methacrylate and acrylate radicals.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]$_n$, is used to depict the number of repeating units in a polymer's chemical formula, the formula should be interpreted to represent the number average molecular weight of the macromolecule.

A "macromolecule" is an organic compound having a molecular weight of greater than 1500, and may be reactive or non-reactive.

A "polymer" is a macromolecule of repeating chemical units linked together into a chain or network structure and is composed of repeating units derived from the monomers and macromers included in the reactive mixture.

A "homopolymer" is a polymer made from one monomer or macromer; a "copolymer" is a polymer made from two or more monomers, macromers or a combination thereof; a "terpolymer" is a polymer made from three monomers, macromers or a combination thereof. A "block copolymer" is composed of compositionally different blocks or segments. Diblock copolymers have two blocks. Triblock copolymers have three blocks. "Comb or graft copolymers" are made from at least one macromer.

A "repeating unit" or "repeating chemical unit" is the smallest repeating group of atoms in a polymer that result from the polymerization of monomers and macromers.

A "biomedical device" is any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, sutures and ophthalmic devices such as intraocular lenses and contact lenses. The biomedical devices may be ophthalmic devices, such as contact lenses, including contact lenses made from silicone hydrogels.

"Individual" includes humans and vertebrates.

"Ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

"Ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutriceutical components, or a combination of any of the foregoing. Examples of ophthalmic devices include, but are not limited to, lenses and optical and ocular inserts, including, but not limited to punctal plugs and the like. "Lens" includes soft contact lenses, hard contact lenses, hybrid contact lenses, intraocular lenses, and overlay lenses. The ophthalmic device may comprise a contact lens.

"Contact lens" refers to a structure, an ophthalmic device that can be placed on the cornea of an individual's eye. The contact lens may provide corrective, cosmetic, therapeutic benefit, including wound healing, delivery of drugs or neutraceuticals, diagnostic evaluation or monitoring, or UV blocking and visible light or glare reduction, or a combination thereof. A contact lens can be of any appropriate material known in the art, and can be a soft lens, a hard lens, or a hybrid lens containing at least two distinct portions with different properties, such as modulus, water content, light absorbing characteristics or combinations thereof.

The biomedical devices, ophthalmic devices, and lenses of the present invention may be comprised of silicone hydrogels. These silicone hydrogels typically contain a silicone component and/or hydrophobic and hydrophilic monomers that are covalently bound to one another in the cured device.

"Silicone hydrogel contact lens" refers to a contact lens comprising at least one silicone hydrogel material. Silicone hydrogel contact lenses generally have increased oxygen permeability compared to conventional hydrogels. Silicone hydrogel contact lenses use both their water and polymer content to transmit oxygen to the eye.

A "polymeric network" is cross-linked macromolecule that can swell but cannot dissolve in solvents, because the polymeric network is essentially one macromolecule. "Hydrogel" or "hydrogel material" refers to a polymeric network that contains water in an equilibrium state. Hydrogels generally contain at least about 10 wt. % water.

"Conventional hydrogels" refer to polymeric networks made from monomers without any siloxy, siloxane or carbosiloxane groups. Conventional hydrogels are prepared from monomeric mixtures predominantly containing hydrophilic monomers, such as 2-hydroxyethyl methacrylate ("HEMA"), N-vinyl pyrrolidone ("NVP"), N, N-dimethylacrylamide ("DMA"), or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available hydrogel formulations include, but are not limited to, etafilcon, polymacon, vifilcon, genfilcon, lenefilcon, hilafilcon, nesofilcon, and omafilcon, including all of their variants.

"Silicone hydrogel" refers to a hydrogel obtained by copolymerization of at least one silicone-containing component with at least one hydrophilic component. Hydrophilic components may also include non-reactive polymers. Each of the silicone-containing components and the hydrophilic components may be a monomer, macromer or combination thereof. A silicone-containing component contains at least one siloxane or carbosiloxane group. Examples of commercially available silicone hydrogels include balafilcon, acquafilcon, lotrafilcon, comfilcon, delefilcon, enfilcon, fanfilcon, formofilcon, galyfilcon, senofilcon, narafilcon, falcon II, asmofilcon A, samfilcon, riofilcon, stenficlon, somofilcon, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/048847. These patents, as well as all other patents disclosed in this paragraph, are hereby incorporated by reference in their entireties "Silicone-containing component" refers to a monomer, macromer, prepolymer, crosslinker, initiator, additive, or polymer that contains at least one silicon-oxygen bond, in the form of siloxane [—Si—O—Si] group or carbosiloxane group. Examples of silicone-containing components include, but are not limited to, silicone macromers, prepolymers, and monomers. Examples of silicone macromers include, but are not limited to, polydimethylsiloxane methacrylated with pendant hydrophilic groups. Examples of silicone-containing components which are useful in this invention may be found in U.S. Pat. Nos. 3,808,178, 4,120,570, 4,136,250, 4,153,641, 4,740,533, 5,034,461, 5,962,548, 5,244,981, 5,314,960, 5,331,067, 5,371,147, 5,760,100, 5,849,811, 5,962,548, 5,965,631, 5,998,498, 6,367,929, 6,822,016, 5,070,215, 8,662,663, 7,994,356, 8,772,422, 8,772,367, EP080539 and WO2014/123959.

"Reactive mixture" and "reactive monomer mixture" refer to the mixture of components (both reactive and non-reactive) which are mixed together and when subjected to polymerization conditions, form the silicone hydrogels and lenses of the present invention. The reactive mixture comprises reactive components such as monomers, macromers, prepolymers, cross-linkers, initiators, diluents, and additional components such as wetting agents, release agents, dyes, light absorbing compounds such as UV absorbers, pigments, dyes and photochromic compounds, any of which may be reactive or non-reactive but are capable of being retained within the resulting biomedical device, as well as active components such as pharmaceutical and neutraceutical compounds, and any diluents. It will be appreciated that a wide range of additives may be added based upon the biomedical device which is made, and its intended use. Concentrations of components of the reactive mixture are given in weight % of all components in the reaction mixture, excluding diluent. When diluents are used their concentrations are given as weight % based upon the amount of all components in the reaction mixture and the diluent.

"Monomer" is a molecule having non-repeating functional groups, which can undergo chain growth polymerization, and in particular, free radical polymerization. Some monomers have di-functional impurities that can act as cross-linking agents. "Macromers" are linear or branched polymers having a repeating structure and at least one reactive group that can undergo chain growth polymerization. Monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) are referred to as macromers.

"Reactive components" are the components in the reactive mixture which become part of the structure of the polymeric network of the resulting silicone hydrogel, by covalent bonding, hydrogen bonding or the formation of an interpenetrating network. Diluents and processing aids which do not become part of the structure of the polymer are not reactive components. Typically, the chemical structure of the macromer is different than the chemical structure of the target macromolecule, that is, the repeating unit of the macromer's pendent group is different than the repeating unit of the target macromolecule or its main chain.

"Polymerizable" means that the compound comprises at least one reactive group which can undergo chain growth polymerization, such as free radical polymerization. Examples of reactive groups include the monovalent reactive groups listed below. "Non-polymerizable" means that the compound does not comprises such a polymerizable group.

"Monovalent reactive groups" are groups that can undergo chain growth polymerization, such as free radical and/or cationic polymerization. Non-limiting examples of free radical reactive groups include (meth)acrylates, styrenes, vinyl ethers, (meth)acrylamides, N-vinyllactams, N-vinylamides, O-vinylcarbamates, O-vinylcarbonates, and other vinyl groups. In one embodiment, the free radical reactive groups comprise (meth)acrylate, (meth)acrylamide, N-vinyl lactam, N-vinylamide, and styryl functional groups, or (meth)acrylates, (meth)acrylamides, and mixtures of any of the foregoing.

Examples of the foregoing include substituted or unsubstituted $C_{1-6}$alkyl(meth)acrylates, $C_{1-6}$alkyl(meth)acrylamides, $C_{2-12}$alkenyls, $C_{2-12}$alkenylphenyls, $C_{2-12}$alkenylnaphthyls, $C_{2-6}$alkenylphenyl$C_{1-6}$alkyls, where suitable substituents on said $C_{1-6}$ alkyls include ethers, hydroxyls, carboxyls, halogens and combinations thereof.

Other polymerization routes such as living free radical and ionic polymerization can also be employed. The device-forming monomers may form hydrogel copolymers. For hydrogels, the reactive mixture will typically include at least one hydrophilic monomer.

Hydrophilic components are those which yield a clear single phase when mixed with deionized water at 25° C. at a concentration of 10 wt. %.

"Interpenetrating polymer networks" or "IPNs" are polymers comprising two or more polymeric networks which are at least partially interlaced on a molecular scale, but not covalently bonded to each other and cannot be separated unless chemical bonds are broken.

"Semi-interpenetrating polymer networks" or "semi-IPNs" are polymer comprising one or more polymer network(s) and one or more linear or branched polymer(s) characterized by the penetration on a molecular scale of at least one of the networks by at least some of the linear or branched chains.

A "cross-linking agent" is a di-functional or multi-functional component which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

The silicone hydrogels of the present invention are formed from reactive mixtures comprising (a) at least one N-alkyl methacrylamide monomer, (b) at least one silicone-containing component, and (e) at least one cross-linking agent. The N-alkyl methacrylamide monomer has the structure shown in Formula XV:

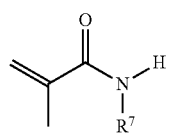

Formula XV wherein $R^7$ is selected from linear, branched, or cyclic alkyl groups containing one to eight carbon atoms, benzyl or phenyl, any of which may be un-substituted or substituted with additional functional groups such as hydroxyl, amino, and the like.

$R^7$ may also be selected from the group consisting of unsubstituted $C_1$-$C_4$ alkyl groups. When $R^7$ is methyl, the N-alkyl methacrylamide monomer is N-methyl methacrylamide (NMMA).

The N-alkyl methacrylamide monomer may be present in the reactive mixture in concentrations between about 1 and about 50 weight percent, about 5 to about 50, about 7 to about 30, about 7 to about 25 or about 7 to about 20 wt %, based upon all reactive components.

It has been surprisingly found that hydrogels made from reactive mixtures comprising at least one N-alkyl methacrylamide monomer and at least one silicone containing component display significantly increased modulus, while still retaining water content values of greater than 10% or 15% water. The modulus values can range up to 200,000 psi. Despite their surprisingly increased modulus, the silicone hydrogels of the present invention are not brittle, and have acceptable % elongation values greater than 5%, or greater than 10%. These materials may be used to create hybrid contact lenses, with rigid centers which retain their shape when placed on eye, instead of vaulting over the cornea. This creates a stiffer central optic zone relative to the peripheral zone of the contact lens. Stiffness is the modulus of the material, E, multiplied by the cube of thickness, t: $Et^3$.

For contact lenses, as a lens gets thicker, especially beyond about 150 or 200 microns, lens awareness increases. Thus, when creating a hybrid lens, it may be desirable use materials having moduli greater than about 1,000, 10,000 or 100,000. The at least one N-alkyl methacrylamide monomer and siloxane groups on the at least one silicone containing component appear to interact with each other to create hydrogels having increased modulus values compared to formulations without both the at least one N-alkyl methacrylamide monomer and at least one silicone containing component.

The silicone-containing component may be a monomer or macromer and may comprise at least one monovalent reactive group and at least one siloxane group. The silicone-containing components may have at least four repeating siloxane units, which may be any of the groups defined below.

The silicone-containing component may also contain at least one fluorine atom. The silicone-containing component may be selected from the polydisubstituted siloxane macromer of Formula XVI

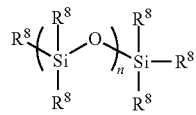

Formula XVI wherein at least one $R^8$ is a monovalent reactive group, and the remaining $R^8$ are independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; fluoroalkyl alkyl or aryl groups; partially fluorinated alkyl or aryl groups; halogens; linear, branched or cyclic alkoxy or aryloxy groups; linear or branched polyethyleneoxyalkyl groups, polypropyleneoxyalkyl groups, or poly(ethyleneoxy-co-propyleneoxyalkyl groups; and monovalent siloxane chains comprising between 1-100 siloxane repeat units which may further comprise functionality selected from alkyl, alkoxy, hydroxy, amino, oxa, carboxy, alkyl carboxy, alkoxy, amido, carbamate, halogen or combinations thereof; and wherein n is 0 to 500 or 0 to 200, or 0 to 100, or 0 to 20, where it is understood that when n is other than 0, n is a distribution having a mode equal to a stated value.

In Formula XVI from one to three $R^8$ may comprise monovalent reactive groups. Suitable monovalent alkyl and aryl groups include unsubstituted and substituted monovalent linear, branched or cyclic $C_1$ to $C_{16}$ alkyl groups, or unsubstituted monovalent $C_1$ to $C_6$ alkyl groups, such as substituted and unsubstituted methyl, ethyl, propyl, butyl, substituted or unsubstituted $C_6$-$C_{14}$ aryl groups, or a substituted or un-substituted $C_6$ aryl group, wherein the substituents include amido, ether, amino, halo, hydroxyl, carboxyl, carbonyl groups; or a phenyl or benzyl group, combinations thereof and the like.

When one $R^8$ is a monovalent reactive group, the additional silicone containing compounds may be selected from the polydisubstituted siloxane macromer of Formulae I or II; the styryl polydisubstituted siloxane macromer of Formula III or IV; or the carbosilane of Formula V:

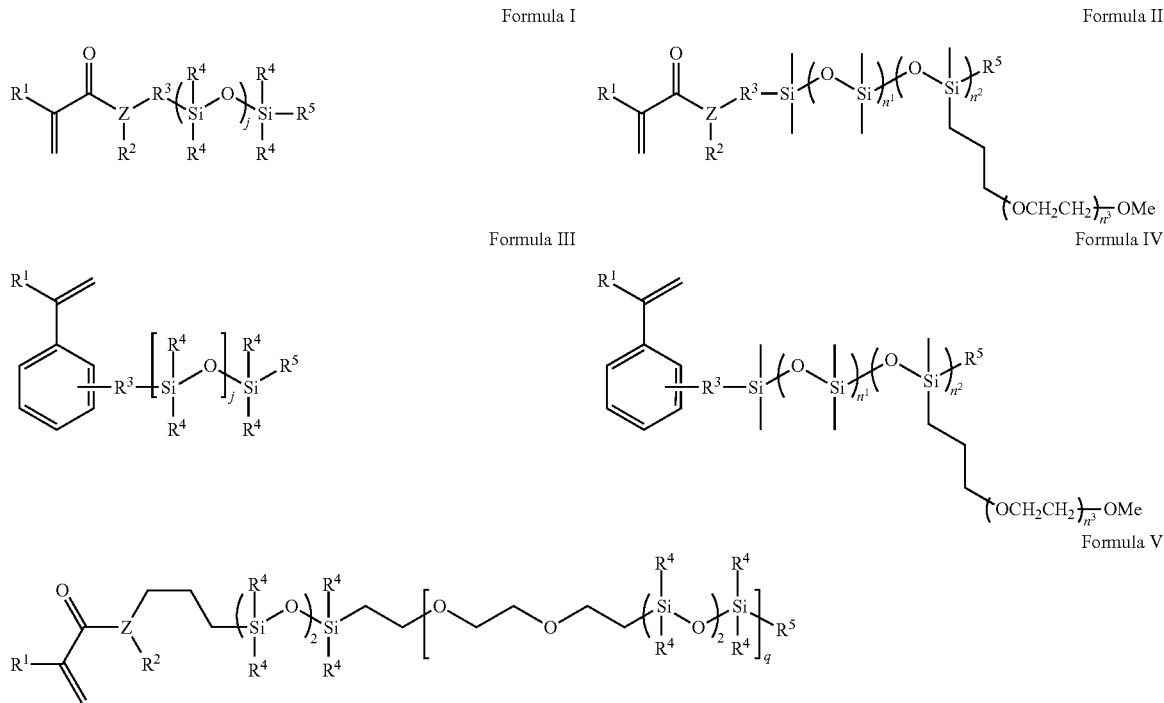

Formula I, Formula II, Formula III, Formula IV, Formula V wherein R¹ is a hydrogen atom or methyl; Z is selected from O, N, S or NCH$_2$CH$_2$O; when Z=O or S, R² is not required; wherein j is a whole number between 1 and 20; q is up to 50, 5 to 30 or 10-25; and n¹ and n² are between 4 to 100; 4 to 50; or 4 to 25; n³ is 1-50, 1-20, or 1-10;

wherein R² is H or is a linear, branched, or cyclic alkyl group containing one to eight carbon atoms (or 3 to 8 carbon atoms), any of which may be further substituted with at least one hydroxy group, and which may be optionally substituted with amide, ether, and combinations thereof;

wherein R³ is a substituted or unsubstituted $C_{1-6}$, $C_{1-4}$ or $C_{2-4}$ alkylene segment such as (CH$_2$)$_r$, wherein each methylene group may optionally be independently substituted with ethers, amines, carbonyls, carboxylates, carbamates and combinations thereof; or an oxyalkylene segment (OCH$_2$)$_k$ and k is a whole number from one to three, or wherein R³ may be a mixture of alkylene and oxyalkylene segments and the sum of r and k is between 1 and 9;

wherein each R⁴ is independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof;

wherein R⁵ is a substituted or un-substituted linear or branched alkyl group having 1 to eight carbon atoms, or 1 to 4 carbon atoms, or methyl or butyl; or an aryl group, any of which may be substituted with one or more fluorine atoms.

Non-limiting examples of polysiloxane macromers include mono-methacryloxypropyl terminated mono-n-butyl terminated polydimethylsiloxanes (mPDMS) as shown in Formula XVII wherein n is between 3 and 15; mono-methacryloxypropyl terminated mono-n-alkyl terminated polydimethylsiloxanes, mono-n-alkyl terminated, polydimethyl, polyethylene glycol siloxanes as shown in Formulae XVIII and XXIII wherein n is between 4-100, 4 and 20, or between 3 and 15; n¹ and n² are between 4 to 100, 4 to 50, or 4 to 25; n³ is 1-50, 1-20, or 1-10; R¹ is hydrogen or methyl group; and R⁵ may be C$_1$-C$_4$ alkyl or methyl or butyl; and macromers having the chemical structures as shown in Formulae XXIV through XXVI, wherein n is between 4-100, 4 and 20, or between 3 and 15; n¹ and n² are between 4 to 100, 4 to 50, or 4 to 25; n³ is 1-50, 1-20, or 1-10; R² is H or is a linear, branched, or cyclic alkyl group containing one to eight carbon atoms, any of which may be further substituted with at least one hydroxy group, and which may be optionally substituted with amide, ether, and combinations thereof; and R⁵ may be C$_1$-C$_4$ alkyl or methyl or butyl.

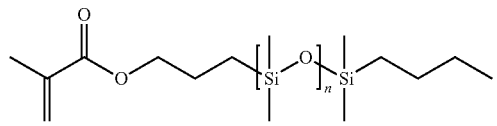

Formula XVII

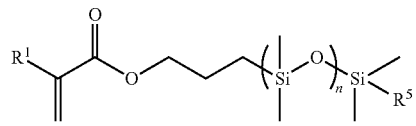

Formula XVIII

Formula XIX

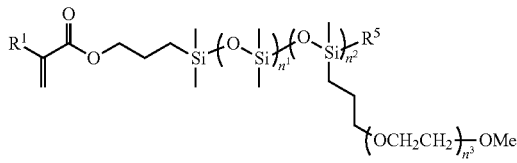

Formula XX

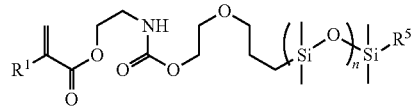

Formula XXI

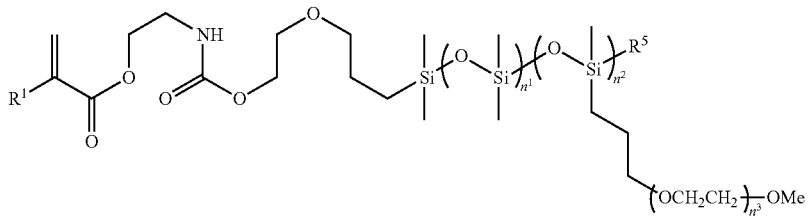

Formula XXII

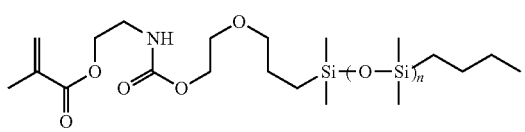

Formula XXIII

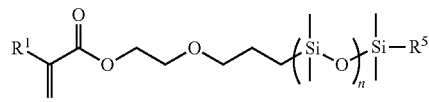

Formula XXIV

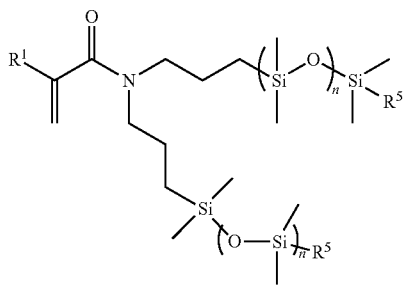

Formula XXV

Formula XXVI

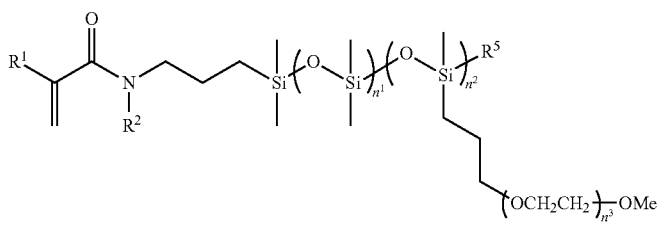

Examples of suitable mono(meth)acryloxyalkylpolydi substituted siloxanes include mono(meth)acryloxypropyl terminated mono-n-butyl terminated polydimethylsiloxane, mono(meth)acryloxypropyl terminated mono-n-methyl terminated polydimethylsiloxane, mono(meth)acryloxypropyl terminated mono-n-butyl terminated polydiethylsiloxane, mono(meth)acryloxypropyl terminated mono-n-methyl terminated polydiethylsiloxane, mono(meth)acrylamidoalkylpolydialkylsiloxanes mono(meth)acryloxyalkyl terminated mono-alkyl polydiarylsiloxanes, and mixtures thereof.

In Formula XVI, when n is zero, one or more $R^8$ may comprise a monovalent reactive group, two or more $R^8$ comprise tris(tri-$C_{1-4}$alkyl-siloxysilane) groups, monovalent siloxane chains comprising between 1-100, 1-10 or 1-5 siloxane repeat units which may further comprise functionality selected from alkyl, alkoxy, hydroxy, amino, oxa, carboxy, alkyl carboxy, alkoxy, amido, carbamate, halogen or combinations thereof; and the remaining $R^8$ are selected from monovalent alkyl groups having 1 to 16, 1 to 6 or 1-4 carbon atoms. Non-limiting examples of silicone components include, 3-methacryloxypropyltris(trimethylsiloxy)silane (TRIS), 3-methacryloxypropylbis(trimethylsiloxy) methylsilane, and 3-methacryloxypropylpentamethyl disiloxane.

The number of siloxane repeating units, n, may also be 2 to 50, 3 to 25, or 3 to 15; wherein at least one terminal $R^8$ comprises a monovalent reactive group and the remaining $R^8$ are selected from monovalent alkyl groups having 1 to 16 carbon atoms, or from monovalent alkyl groups having 1 to 6 carbon atoms. Silicone-containing compounds may also include those where n is 3 to 15, one terminal $R^8$ comprises a monovalent reactive group, the other terminal $R^8$ comprises a monovalent alkyl group having 1 to 6 carbon atoms and the remaining $R^8$ comprise monovalent alkyl group having 1 to 3 carbon atoms. Non-limiting examples of silicone components include monomethacryloxypropyl n-butyl terminated polydimethylsiloxanes ($M_n$=800-1000), (mPDMS, as shown in XVII).

Formula XVI may also include compounds where n is 5 to 400 or from 10 to 300, both terminal $R^8$ comprise monovalent reactive groups and the remaining $R^8$ are independently of one another selected from monovalent alkyl groups having 1 to 18 carbon atoms which may have ether linkages between carbon atoms and may further comprise halogen.

One to four $R^8$ in Formula XVI may comprise a vinyl carbonate or vinyl carbamate of Formula XXVII:

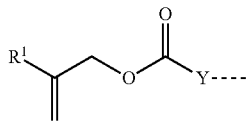

Formula XXVII wherein Y denotes O—, S— or NH—; $R^1$ denotes a hydrogen atom or methyl.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and the crosslinking agent of Formula XXVIII.

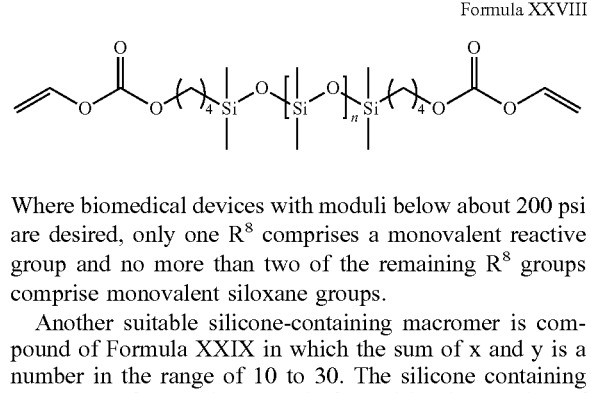

Formula XXVIII

Where biomedical devices with moduli below about 200 psi are desired, only one $R^8$ comprises a monovalent reactive group and no more than two of the remaining $R^8$ groups comprise monovalent siloxane groups.

Another suitable silicone-containing macromer is compound of Formula XXIX in which the sum of x and y is a number in the range of 10 to 30. The silicone containing macromer of Formula XXIX is formed by the reaction of fluoroether, hydroxy-terminated polydimethylsiloxane, isophorone diisocyanate and isocyanatoethylmethacrylate.

The non-hydroxyl containing silicone-containing component may be selected from non-hydroxyl containing acrylamide silicones of U.S. Pat. No. 8,415,405. Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone-containing macromers made via GTP, such as those disclosed in U.S. Pat. Nos. 5,314,960, 5,331,067, 5,244,981, 5,371,147, and 6,367,929. U.S. Pat. Nos. 5,321,108, 5,387,662, and 5,539,016 describe polysiloxanes with a polar fluorinated graft or side group having a hydrogen atom attached to a terminal difluoro-substituted carbon atom. US 2002/0016383 describes hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

The non-hydroxyl containing silicone component may be selected from the group consisting of monomethacryloxypropyl terminated, mono-n-alkyl terminated linear polydisubstituted siloxane; methacryloxypropyl-terminated linear polydisubstituted siloxane; and mixtures thereof.

The non-hydroxyl containing silicone component may also be selected from monomethacrylate terminated, $C_1$-$C_4$ alkyl terminated, linear polydimethylsiloxanes; and mixtures thereof.

In some instances, the non-hydroxyl functionalized silicone-containing component may be used in amounts up to about 10 wt %. Examples include those selected from mPDMS of Formula XXIII where $R^5$ is methyl or butyl, compounds of Formulae XIX through XXVI and the macromers shown in Formula XXX or XXXI where n is n is 1-50 and m is 1-50, 1-20 or 1-10:

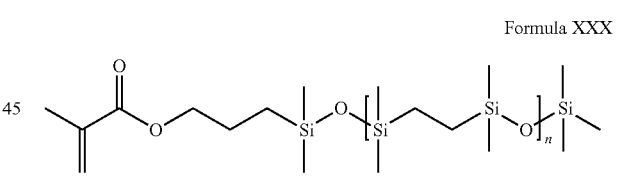

Formula XXX

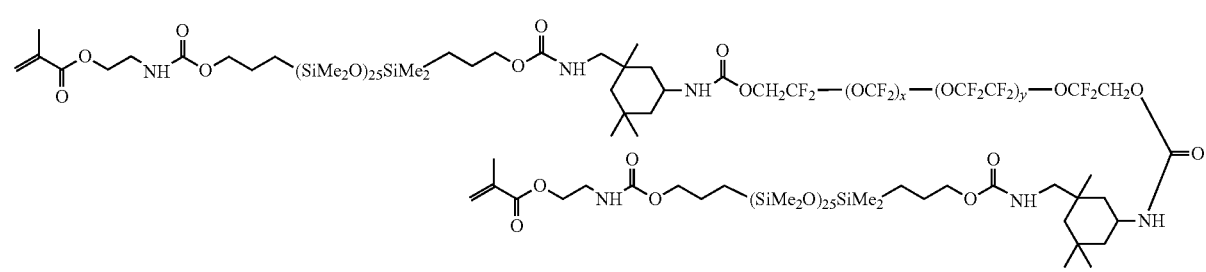

Formula XXIX

Formula XXXI

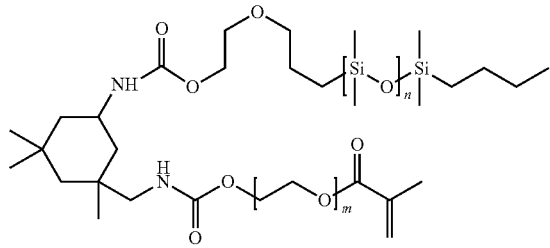

Specific examples of silicone containing crosslinkers include bismethacryloxypropyl polydimethyl siloxane, wherein n may be 4-200, or 4-150, and the following compounds of Formulae XXXII-XXXVII; wherein $n^1$ and $n^2$ are independently selected from 4 to 100; 4 to 50; or 4 to 25; $n^3$ is 1-50, 1-20 or 1-10, m is 1-100, 1-50, 1-20 or 1-10, and q is up to 50, 5-30 or 10-25;

wherein $R^1$ is a hydrogen atom or methyl; Z is selected from O, N, S or $NCH_2CH_2O$; when Z=O or S, $R^2$ is not required;

wherein $R^2$ is H or is a linear, branched, or cyclic alkyl group containing one to eight carbon atoms, any of which may be further substituted with at least one hydroxy group, and which may be optionally substituted with amide, ether, and combinations thereof;

wherein each $R^4$ is independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof.

Formula XXXII

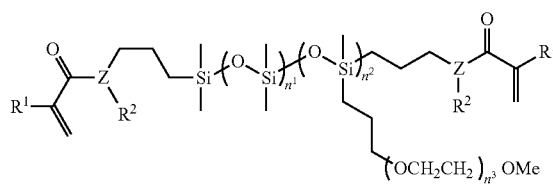

Formula XXXIII

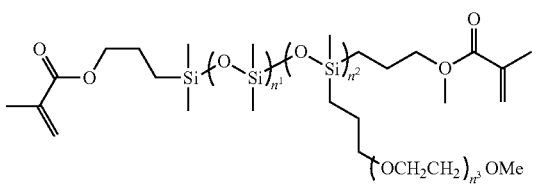

Formula XXXIV

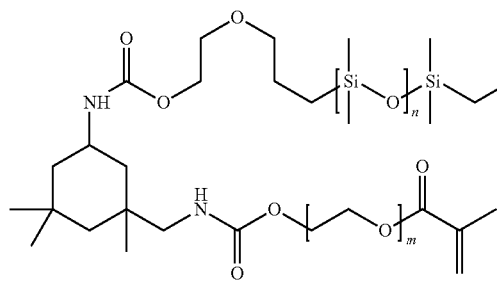

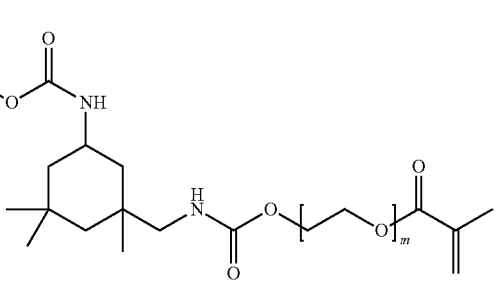

Formula XXXV

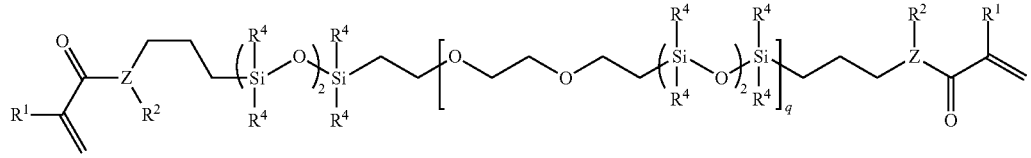

Formula XXXVI

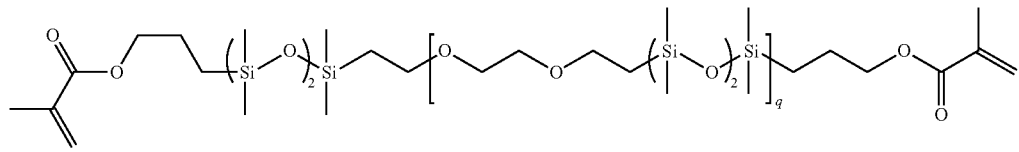

Formula XXXVII

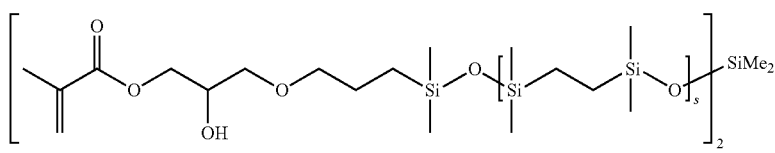

The non-hydroxyl containing silicone component may have an average molecular weight of from about 400 to about 4000 Daltons.

When Z is O, the silicone containing component may be a mono-methacryloxypropyl terminated mono-n-butyl terminated polydimethylsiloxanes (mPDMS) as shown in Formula XVII wherein n is between 3 and 15; mono-methacryloxypropyl terminated mono-n-alkyl terminated polydimethylsiloxanes as shown in Formula XVIII wherein n is between 3 and 15; $R^1$ is a hydrogen or methyl group; and $R^5$ is a linear, branched, or cyclic alkyl group containing between 1 and 8 carbon atoms; and macromers having the chemical structures as shown in Formulae X through XIII wherein n is between 4 and 20, or between 3 and 15, 3-30, 3-25, 3-20 or 3-15.

When Z is N, further examples of polysiloxane macromers include mono(meth)acrylamidoalkylpolydialkylsiloxanes may be selected from those disclosed in U.S. Pat. No. 8,415,405, and those shown in Formulae XXXVIII, mono(meth)acrylamidoalkyl polydimethylsiloxanes, such as those in Formulae XXXIX-XLII, wherein n is between 4 and 20, or between 3 and 15, 3-30, 3-25, 3-20 or 3-15;

wherein $R^1$ is a hydrogen or methyl group;

wherein $R^2$ is H or is a linear, branched, or cyclic alkyl group containing one to eight carbon atoms, any of which may be further substituted with at least one hydroxy group, and which may be optionally substituted with amide, ether, and combinations thereof;

wherein each $R^4$ is independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof;

wherein $R^5$ is a substituted or un-substituted linear or branched alkyl group having 1 to eight carbon atoms, or 1 to 4 carbon atoms, or methyl or butyl; or an aryl group, any of which may be substituted with one or more fluorine atoms; and N-(2,3-dihydroxypropane)-N'-(propyl tetra(dimethylsiloxy) dimethylbutylsilane)acrylamide:

Formula XXXVIII

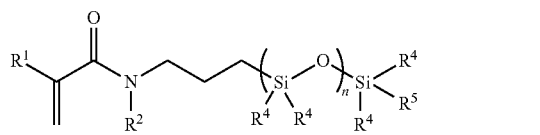

Formula XXXIX

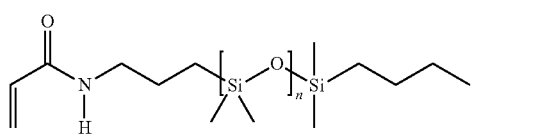

Formula XL

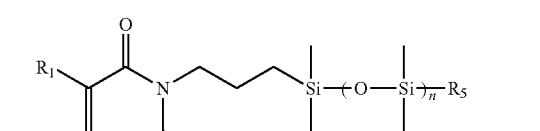

Formula XLI

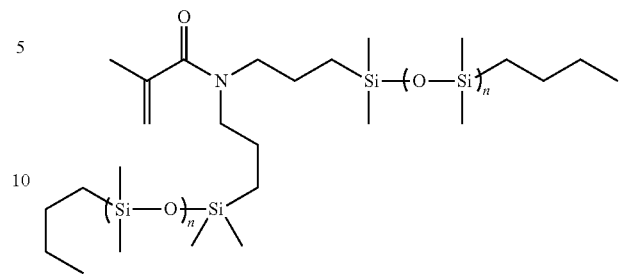

Formula XLII

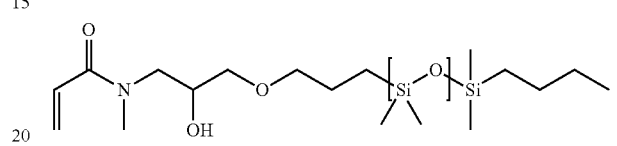

Formula XLIII

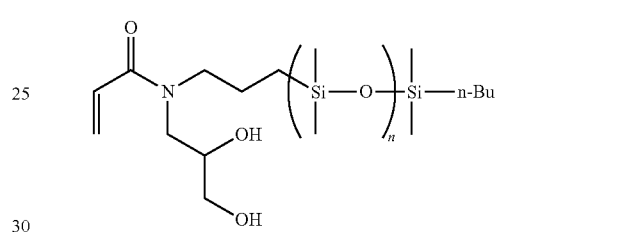

Examples of styryl monomers include tris(trimethylsiloxy)silyl styrene. Examples of styryl macromers are shown below in chemical formulae XLIV through XLIX, wherein n is between 4 and 20, or between 3 and 15, 3-30, 3-25, 3-20 or 3-15.

Formula XLIV

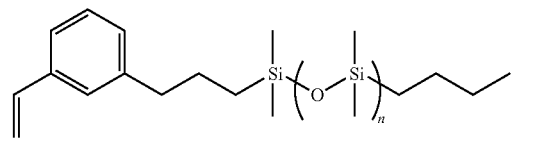

Formula XLV

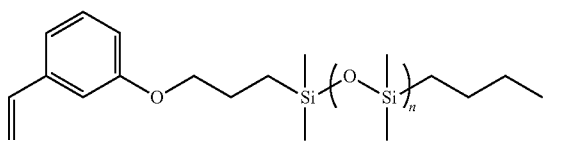

Formula XLVI

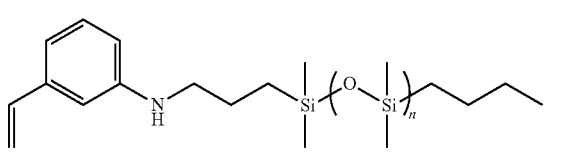

Formula XLVII

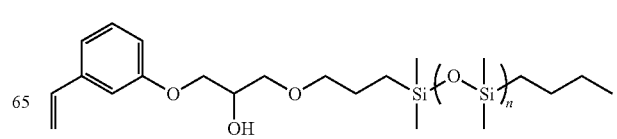

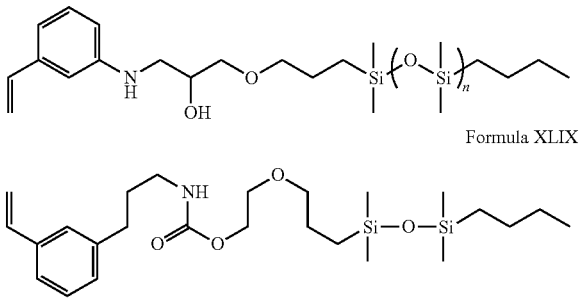

Formula XLVIII

Formula XLIX

The length of the silicone chain may have an impact on the modulus of the resulting silicone hydrogel and may be adjusted along with the other components of the reactive mixture to achieve the desired balance of physical and mechanical properties. For instance, the amounts of NMMA and the length of the silicone chain may be chosen to attain a water content of the silicone hydrogel that moderates stiffness and increases elongation to break concurrently. As the polydialkylsiloxane chain length increases, modulus will decrease and elongation to break will increase. Polydialkylsiloxane chain lengths between 1 and 20, 1 and 15, 3-30, 3-25, 3-20 or 3-15 may be selected.

The silicone-containing component may further include silicone-containing monomers with branched siloxane groups. Examples include tris(trimethylsiloxy)silylstyrene (Styryl-TRIS), 3-tris(trimethylsiloxy)silylpropyl methacrylate (TRIS), N-[3-tris(trimethylsiloxy)silyl]-propyl acrylamide (TRIS-Am, Formula XI), 2-hydroxy-3-[3-methyl-3,3-di(trimethylsiloxy)silylpropoxy]-propyl methacrylate (SiMAA, Formula XXII), and other bulky silicone monomers, such as those in Formulae VI through XIV.

The aforementioned macromers have methacrylate, acrylamide, or methacylamide reactive groups. These reactive groups may be replaced with any other reactive group capable of undergoing free radical polymerization, such as acrylates, styrenes, vinyl ethers, N-vinyllactams, N-vinylamides, N-vinylimides, N-vinylureas, O-vinylcarbamates, O-vinylcarbonates, and other vinyl compounds. Where moduli greater than about 5000 psi are desired, monomers and macromers with styryl reactive groups are beneficially included.

Alternative silicone-containing components suitable for use include those described in WO 96/31792 and U.S. Pat. Nos. 5,314,960, 5,331,067, 5,244,981, 5,371,147, 6,367,929, 5,321,108, 5,387,662, 5,539,016, 6,867,245, and others will be apparent to one skilled in the art Hydroxyl-Containing Silicone Component The silicone containing component may also comprise one or more hydroxyl-containing silicone component. Hydroxyl-containing silicone components may help to compatibilize high concentrations of silicone containing components with hydrophilic components, including polymeric hydrophilic components, and silicone components having bulky siloxane groups or longer chains of repeating siloxane units. Hydroxyl-containing silicone components include hydroxyl containing silicone monomers and macromers. The Hydroxyl-containing silicone components may have 4 to 200, 4-100 or 4-20 siloxane repeating units and may be monofunctional or multifunctional.

Hydroxyl-containing silicone components having 4 polydisubstituted siloxane repeating units in the siloxane chain are not a distribution and have four repeating units in each monomer. For all hydroxyl-containing silicone components having more than four polydisubstituted siloxane repeating units in the siloxane chain the number of repeating units is a distribution, with the peak of the distribution centered around the listed number of repeat units.

Examples of hydroxyl-containing silicone monomers include propenoic acid-2-methyl-2-hydroxy-3-[3-[1,3,3,3-tetramethyl-1-[(trimethylsilyl)oxy]-1-disiloxanyl]propoxy] propyl ester ("SiGMA", Formula XII), and 2-hydroxy-3-methacryloxypropyloxypropyl-tris(trimethylsiloxy)silane, and compounds of Formula IX.

The hydroxyl-containing silicone components may be selected from monofunctional hydroxyl substituted poly (disubstituted siloxane)s of Formula L:

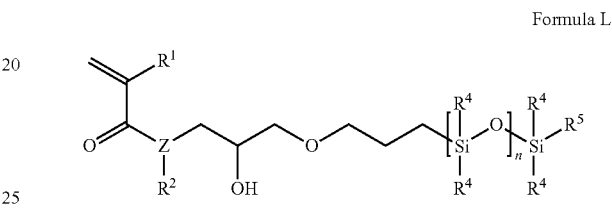

Formula L wherein Z is selected from O, N, S or $NCH_2CH_2O$, when Z is O or S $R^2$ is not present; $R^1$ is independently H or methyl; $R^2$ is H or is a linear, branched, or cyclic alkyl group containing one to eight carbon atoms, any of which may be further substituted with at least one hydroxy group, and which may be optionally substituted with amide, ether, and combinations thereof; $R^4$ is independently a linear, branched, or cyclic alkyl group containing one to eight carbon atoms, any of which may be further substituted with at least one hydroxy group, and which may be optionally substituted with amide, ether, and combinations thereof, or $R^4$ may be independently selected from methyl, ethyl or phenyl, or may be methyl; n is the number of siloxane units and is from 4 to 8 for the first monofunctional hydroxyl substituted poly(disubstituted siloxane) monomer; and $R^5$ is selected from straight or branched $C_1$ to $C_8$ alkyl groups, which may be optionally substituted with one or more hydroxyl, amide, ether, and combinations thereof. $R^5$ may be straight or branched $C_4$ alkyl, either of which may optionally be substituted with hydroxyl, or may be methyl.

Examples of monofunctional hydroxyl containing silicone components include mono-(2-hydroxy-3-methacryloxypropyl)-propyl ether terminated mono-n-butyl terminated polydimethylsiloxanes (OH-mPDMS) as shown in Formula LI wherein n is between 4 and 30, 4-8 or 10-20; and polydimethylsiloxanes having the chemical structures as shown in Formulae LII through LVIII, wherein Z is selected from O, N, S or $NCH_2CH_2O$; when Z=O or S, $R^2$ is not required; wherein n is between 4 and 30, 4-8 or 10-20; wherein $n^1$ $n^2$, and $n^3$ are independently between 4 to 100; 4 to 50; 4 to 25; wherein $R^1$ is a hydrogen or methyl group;

wherein $R^2$ is H or is a linear, branched, or cyclic alkyl group containing one to eight carbon atoms, any of which may be further substituted with at least one hydroxy group, and which may be optionally substituted with amide, ether, and combinations thereof;

wherein $R^5$ is selected from straight or branched $C_1$ to $C_8$ alkyl groups, which may be optionally substituted with one or more hydroxyl, amide, ether, polyhydroxyl groups selected from straight or branched $C_1$ to $C_8$ groups having a formula of $C_fH_g(OH)_h$ wherein f=1-8 and g+h=2f+1 and cyclic $C_1$ to $C_8$ groups having a formula of $C_fH_g(OH)_h$ wherein f=1-8 and g+h=2f−1, and combinations thereof; or $R^5$ may be selected from methyl, butyl or hydroxyl substituted $C_2$-$C_5$ alkyl, including hydroxyl ethyl, hydroxyl propyl, hydroxyl butyl, hydroxyl pentyl and 2,3-dihydroxypropyl, and polycarbosiloxanes of Formulae LVII-LVIII where a between 4-100 or 4-8 for the first hydroxyl-containing silicone component and $R^1$ and $R^5$ are as defined above.

Formula LI

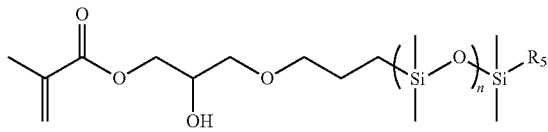

Formula LII

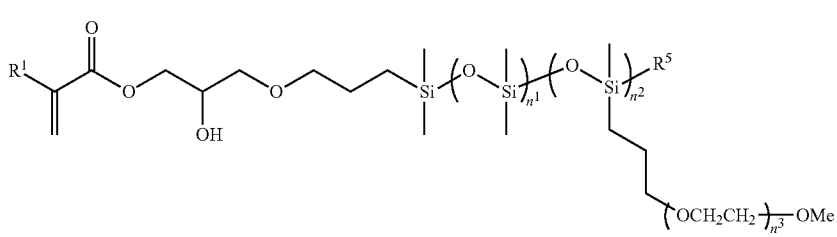

Formula LIII

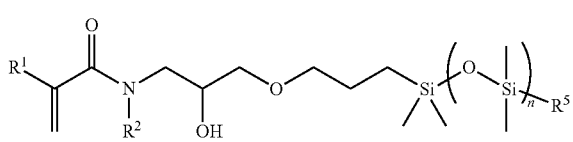

Formula LIV

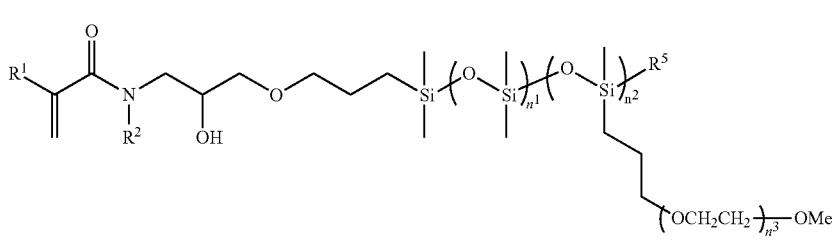

Formula LV

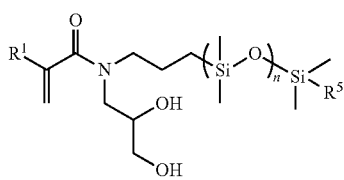

Formula LVI

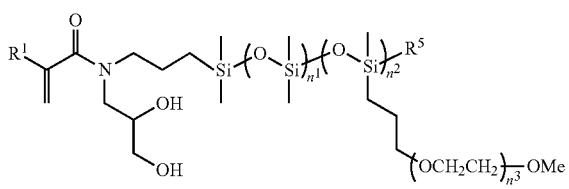

Formula LVII

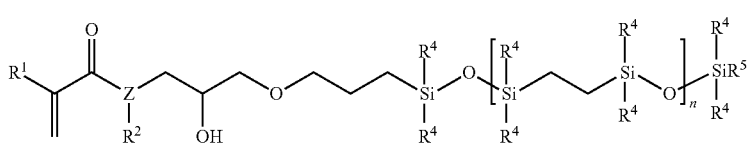

Formula LVIII

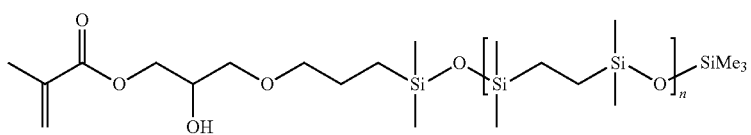

The hydroxyl-containing silicone component may also be selected from multifunctional hydroxyl substituted, poly(disubstituted siloxane) of Formula LIX having 10 to 500, or 10 to 200, or 10 to 100 siloxane repeating units, and mixtures thereof:

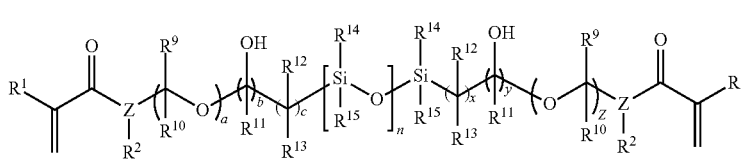

Formula LIX wherein in Formula LIX, Z is selected from O, N, S or $NCH_2CH_2O$; wherein $R^1$ is independently a hydrogen atom or methyl group; for Z=O and S, $R^2$ is not required;

wherein $R^2$ is H or is a linear, branched, or cyclic alkyl group containing one to eight carbon atoms, any of which may be further substituted with at least one hydroxy group, and which may be optionally substituted with amide, ether, and combinations thereof;

wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof; and a, b, c, x, y and z are independently between 0 and 100, between 0 and 50, between 0 and 20, between 0 and 10, or between 0 and 5; and n is the number of siloxane repeating units and is from 10 to 500; 10 to 200; 10 to 100; 10 to 50; 10 to 20.

Examples of multifunctional hydroxyl containing silicones include α-(2-hydroxy-1-methacryloxypropyloxypropyl)-co-butyl-decamethylpentasiloxane and the difunctional polysiloxanes of Formulae LX or LXI:

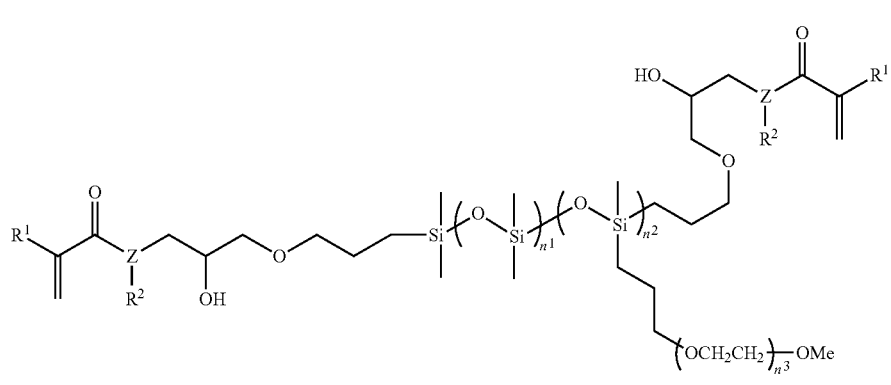

Formula LX

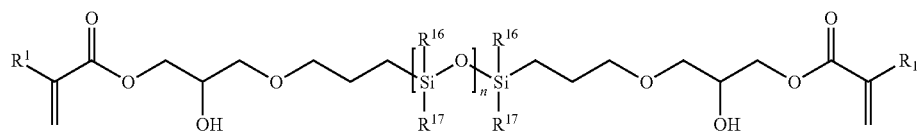

Formula LXI wherein $R^9$, $R^{10}$, $R^{11}$, $R^{12}$, $R^{13}$ are independently selected from the group consisting of a hydrogen atom or any of the substituents defined for $R^{14}$ and $R^{15}$;

wherein $R^{14}$ and $R^{15}$ are independently selected from the group consisting of a linear, branched, or cyclic alkyl group containing one to eight carbon atoms, any of which may be further substituted with at least one hydroxy group, amido, ether, amino, carboxyl, carbonyl groups and combinations; a linear or branched alkyleneoxy group, specifically ethyleneoxy groups, $[CH_2CH_2O]_p$ wherein p is between 1 and 200, or 1 and 100, or 1 and 50, or 1 and 25, or 1 and 20, optionally substituted with one or more hydroxyl, amino, amido, ether, carbonyl, carboxyl, and combinations thereof, a $C_1$-$C_6$ linear or branched fluoroalkyl groups optionally substituted with one or more hydroxyl, amino, amido, ether, carbonyl, carboxyl, and combinations thereof; a substituted or un-substituted aryl groups, specifically phenyl groups, wherein $R^1$ is independently a hydrogen atom or methyl group; $R^{16}$ and $R^{17}$ are independently a linear, branched, or cyclic alkyl group containing one to eight carbon atoms, any of which may be further substituted with at least one hydroxy group, amido, ether, amino, carboxyl, carbonyl groups and combinations thereof; or are independently selected from unsubstituted $C_{1-4}$ alkyl groups and $C_{1-4}$ alkyl groups substituted with hydroxyl or ether; or are selected from methyl, ethyl or —$(CH_2CH_2O)_mOCH_3$; $n^1$ and $n^2$ are independently selected from is 4 to 100; 4 to 50; or 4 to 25 and $n^3$ is 1-50, 1-20, and 1-10; m=1-50, 1-20, and 1-10.

At least one silicone-containing component is present in the reactive mixture in an amount sufficient to provide the desired modulus and oxygen permeability of the silicone hydrogel. It has been found that the N-alkyl methacrylamides provide a surprising increase in modulus when included in formulations also comprising a silicone-containing component. This increase in modulus is not observed in conventional hydrogel formulations. The silicone-containing component may be included in the reactive mixture in amounts from about 20 to about 60 weight %, or from about 30 to about 55 weight %, from about 30 weight % to about 50 weight %, from about 50 weight % to about 60 weight %, all based upon the total weight of all of the reactive components.

It may also be desirable for the resulting silicone hydrogel to exhibit oxygen permeability greater than about 50 barrers, between about 50 barrers and about 200 barrers; between about 70 barrers and about 150 barrers; or between about 80 barrers and about 150 barrers.

Cross-Linking Agent

The silicone hydrogels of the present invention include at least one cross-linking agent. A variety of cross-linking agents may be used, including silicone-containing and non-silicone containing cross-linking agents, and mixtures thereof. Non-silicone-containing cross-linking agents include ethylene glycol dimethacrylate (EGDMA), diethyleneglycol dimethacrylate, trimethylolpropane trimethacrylate (TMPTMA), tetraethylene glycol dimethacrylate (TEGDMA), triallyl cyanurate (TAC), glycerol trimethacrylate, 1,3-propanediol dimethacrylate; 2,3-propanediol dimethacrylate; 1,6-hexanediol dimethacrylate; 1,4-butanediol dimethacrylate, methacryloxyethyl vinylcarbonate (HE-MAVc), allylmethacrylate, methylene bisacrylamide (MBA), polyethylene glycol dimethacrylate (wherein the polyethylene glycol preferably has a molecular weight up to 5,000 Daltons). Any of the above disclosed multifunctional silicone-containing components may be used as cross-linking agents.

Other cross-linking agents will be known to one skilled in the art and may be used to make the silicone hydrogel of the present invention.

The non-silicone containing crosslinking agents are used in amounts from about 0.5 weight % to about 20 weight %, 3 weight % to 20 weight % or from about 3 weight % to about 15 weight %, all based upon the total weight of all of the reactive components. The exact amounts vary depending on the mechanical property targets and the other reactive components in the reactive mixture. In other units, the cross-linking agent may vary from about 16 mmoles in 100 grams of reactive mixture to about 30 mmoles in 100 grams of reactive mixture, and preferably between 16 mmoles/100 grams and 25 mmoles/100 grams of reactive mixture. It may be desirable to select the crosslinking agents which have reactive groups with similar reactivity rates with those of the other components to form the silicone hydrogel networks. Thus it may be desirable to select crosslinking agents with at least one reactive group which is the same as the reactive groups included in the other reactive components. The structure and morphology of the resulting silicone hydrogel may also be influenced by the diluent(s) and cure conditions used.

Multifunctional silicone-containing components, including macromers may also be included to further increase the modulus and retain tensile strength. The silicone containing crosslinking agents may be used alone or in combination with other cross-linking agents. An example of a silicone containing monomer which can act as a crosslinking agent and, when present, does not require the addition of a crosslinking monomer to the reaction mixture includes α,ω-bismethacryloypropyl polydimethylsiloxane.

When silicone cross-linking agents are used in the formulation, limiting the number of siloxane repeating units in the silicone cross-linking agent between 5 and 200, 5 and 150, 5 and 120 allows the retention of modulus values in excess of 15,000 psi, without significantly impacting other properties such as oxygen permeability, and elongation. When moduli over 15,000 psi are desired, silicone cross-linking agents may be included in amounts between 0 to about 25 weight percent, or between about 10 weight percent and 20 weight percent, all based upon the total weight of all of the reactive components.

Non-limiting examples of silicone cross-linking agents are shown in Formulae XXVIII, XXIX, and XXXII through XXXVII, and the following chemical Formulae LXII through LXXII, wherein n is between 1 and 200, preferably n is between 50 and 150, more preferably between 50 and 100, and most preferably n is between 10 and 50.

Formula LXII

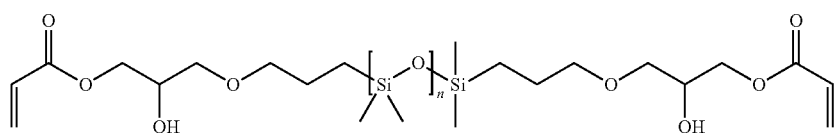

Formula LXIII

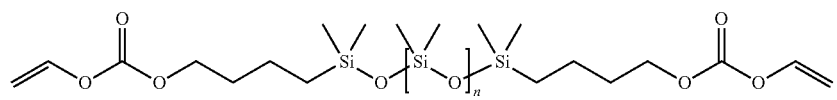

Formula LXIV

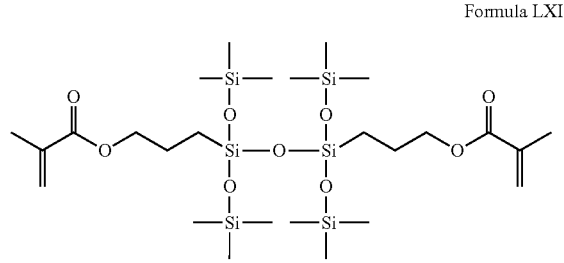

Formula LXV

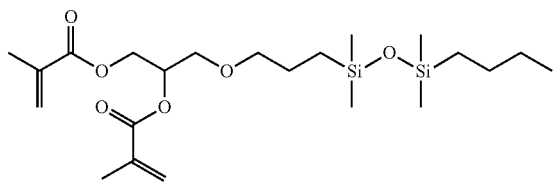

-continued

Formula LXVI

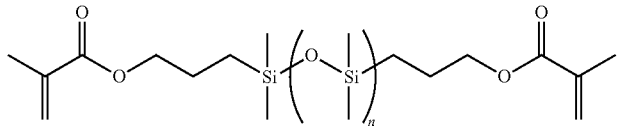

Formula LXVII

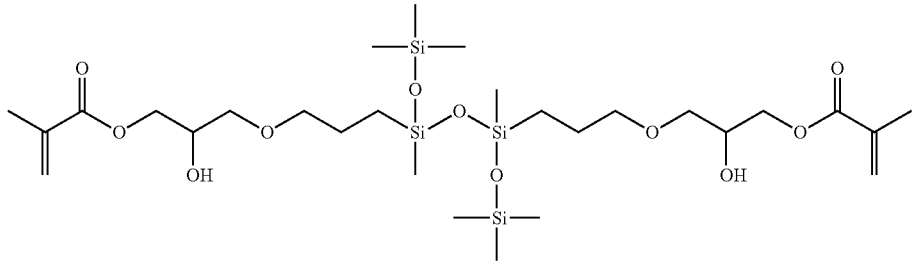

Formula LXVIII

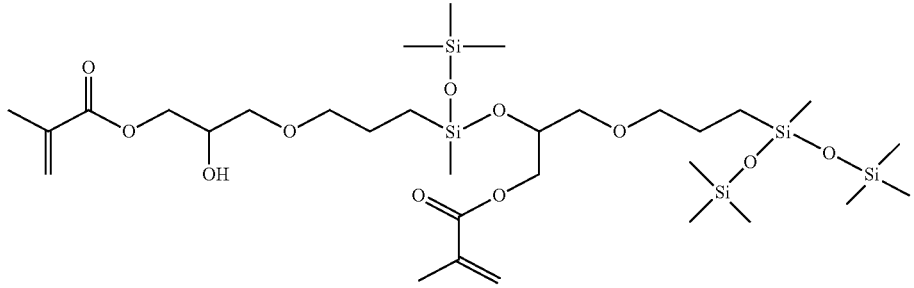

Formula LXIX

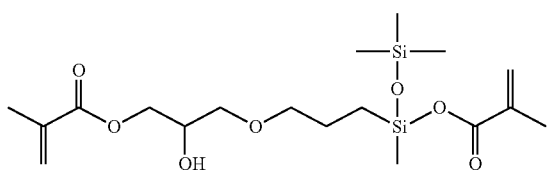

Formula LXX

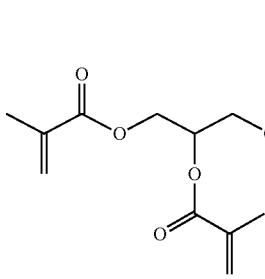

Formula LXXI

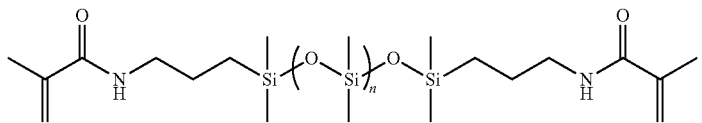

Formula LXXII

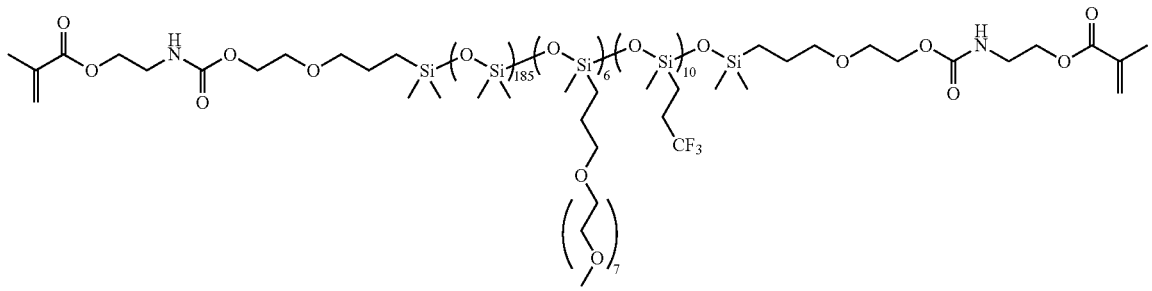

The aforementioned silicone cross-linking agents may also have acrylate, methacrylate, O-vinylcarbonate, or methacylamide reactive groups. These reactive groups may be replaced with any other reactive group capable of undergoing free radical polymerization, such as, styrenes, vinyl ethers, N-vinyllactams, N-vinylamides, N-vinylimides, N-vinylureas, O-vinylcarbamates, and other vinyl compounds. In some embodiments, silicone cross-linking agents with styryl reactive groups are preferred.

Cross-linking agents that have rigid chemical structures and reactive groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)phenyl]propane, and 4-vinylbenzyl methacrylate, and combinations thereof. Rigid crosslinking agents may be included in amounts between about 2 and about 15, or 2-10, 3-7 based upon the total weight of all of the reactive components.

The more NMMA used, the more crosslinker can be used, while still reaching target water contents, and modulus.

The physical and mechanical properties of the silicone hydrogels of the present invention may be optimized for a particular use by adjusting the components in the reactive mixture. It is a benefit of the present invention that the desired moduli may be achieved using monofunctional silicone-containing components.

Hydrophilic Monomer

The silicone hydrogels of the present invention may further include one or more hydrophilic monomer. Hydrophilic monomers can be any of the hydrophilic monomers known to be useful to make hydrogels. Classes of suitable hydrophilic monomers include acrylic-containing monomers and vinyl-containing monomers. Examples of suitable families of hydrophilic monomers include N-vinyl amides, N-vinylimides, N-vinyl lactams, hydrophilic (meth)acrylates, (meth)acrylamides, hydrophilic styrenes, vinyl ethers, O-vinyl carbonates, O-vinyl carbamates, N-vinyl ureas, other hydrophilic vinyl compounds and mixtures thereof.

The hydrophilic monomers that may be used to make the polymers of this invention have at least one polymerizable double bond and at least one hydrophilic functional group. Such hydrophilic monomers may themselves be used as crosslinking agents, however, where hydrophilic monomers having more than one polymerizable functional group are used, their concentration should be limited as discussed above to provide a contact lens having the desired modulus. The term "vinyl-type" or "vinyl-containing" monomers refer to monomers containing the vinyl grouping (—CH═CH$_2$) and are generally highly reactive. Such hydrophilic vinyl-containing monomers are known to polymerize relatively easily.

"Acrylic-type" or "acrylic-containing" monomers are those monomers containing an acrylic group (CH$_2$═CRCOX) wherein R is H or CH$_3$, and X is O or N, which are also known to polymerize readily, such as N,N-dimethyl acrylamide (DMA), 2-hydroxyethyl methacrylamide, polyethyleneglycol monomethacrylate, methacrylic acid, acrylic acid, mixtures thereof and the like.

Hydrophilic monomers with at least one hydroxyl group (hydroxylalkyl monomer) may be used. The hydroxyl alkyl group may be selected from C$_2$-C$_4$ mono or dihydroxy substituted alkyl, and poly(ethylene glycol) having 1-10 repeating units; or is selected from 2-hydroxyethyl, 2,3-dihydroxypropyl, or 2-hydroxypropyl, and combinations thereof.

Examples of hydroxyalkyl monomers include 2-hydroxyethyl (meth)acrylate (HEMA), 3-hydroxypropyl (meth)acrylate, 2-hydroxypropyl (meth)acrylate, 2,3-dihydroxypropyl (meth)acrylate, 2-hydroxybutyl (meth)acrylate, 3-hydroxybutyl (meth)acrylate, 1-hydroxypropyl 2-(meth)acrylate, 2-hydroxy-2-methyl-propyl (meth)acrylate, 3-hydroxy-2,2-dimethyl-propyl (meth)acrylate, 4-hydroxybutyl (meth) acrylate, 2-hydroxyethyl (meth)acrylamide, N-(2-hydroxypropyl) (meth)acrylamide, N,N-bis(2-hydroxyethyl) (meth)acrylamide, N,N-bis(2-hydroxypropyl) (meth)acrylamide, N-(3-hydroxypropyl) (meth)acrylamide, 2,3-dihydroxypropyl (meth)acrylamide, glycerol (meth)acrylate, polyethyleneglycol monomethacrylate, and mixtures thereof.

The hydroxyalkyl monomer may also be selected from the group consisting of 2-hydroxyethyl methacrylate, glycerol methacrylate, 2-hydroxypropyl methacrylate, hydroxybutyl methacrylate, 3-hydroxy-2,2-dimethyl-propyl methacrylate, and mixtures thereof.

The hydroxyalkyl monomer may comprise 2-hydroxyethyl methacrylate, 3-hydroxy-2,2-dimethyl-propyl methacrylate, hydroxybutyl methacrylate or glycerol methacrylate.

When hydrophilic polymers in quantities great than about 3 wt % are desired, Hydroxyl containing (meth)acrylamides are generally too hydrophilic to be included as compatibilizing hydroxyalkyl monomers, and hydroxyl containing (meth)acrylates may be included in the reactive mixture and the lower amount of hydroxyalkyl monomers may be selected to provide a haze value to the final lens of less than about 50% or less than about 30%.

It will be appreciated that the amount of hydroxyl component will vary depending upon a number of factors, including, the number of hydroxyl groups on the hydroxyalkyl monomer, the amount, molecular weight and presence of hydrophilic functionality on the silicone containing components. The hydrophilic hydroxyl component may be present in the reactive mixture in amounts up to about 15%, up to about 10 wt %, between about 3 and about 15 wt % or about 5 and about 15 wt %.

Hydrophilic vinyl-containing monomers which may be incorporated into the hydrogels include monomers such as hydrophilic N-vinyl lactam and N-vinyl amide monomers including: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-carboxyvinyl-β-alanine (VINAL), N-carboxyvinyl-α-alanine, N-vinylimidazole, and mixtures thereof.

Hydrophilic O-vinyl carbamates and O-vinyl carbonates monomers including: N-2-hydroxyethyl vinyl carbamate and N-carboxy-β-alanine N-vinyl ester. Further examples of the hydrophilic vinyl carbonate or vinyl carbamate monomers are disclosed in U.S. Pat. No. 5,070,215, and the hydrophilic oxazolone monomers are disclosed in U.S. Pat. No. 4,910,277. Vinyl carbamates and carbonates, including N-2-hydroxyethyl vinyl carbamate, N-carboxy-β-alanine N-vinyl ester, other hydrophilic vinyl monomers, including vinylimidazole, ethylene glycol vinyl ether (EGVE), di(ethylene glycol) vinyl ether (DEGVE), allyl alcohol, 2-ethyl oxazoline, vinyl acetate, acrylonitrile, and mixtures thereof.

(Meth)acrylamide monomers may also be included as hydrophilic monomers. Examples include N—N-dimethylacrylamide, acrylamide, N,N-bis(2-hydroxyethyl)acrylamide, acrylonitrile, N-isopropyl acrylamide, N,N-dimethylaminopropyl(meth)acrylamide, and any of the hydroxyl functional (meth)acrylamides listed above.

The hydrophilic monomers which may be incorporated into the polymers disclosed herein may be selected from N,N-dimethyl acrylamide (DMA), 2-hydroxyethyl acrylamide, 2-hydroxyethyl methacrylamide, N-hydroxypropyl methacrylamide, bishydroxyethyl acrylamide, 2,3-dihydroxypropyl (meth)acrylamide, N-vinylpyrrolidone (NVP), N-vinyl-N-methyl acetamide, N-vinyl methacetamide (VMA), and polyethyleneglycol monomethacrylate. The hydrophilic monomers may be selected from DMA, NVP, VMA, NVA, and mixtures thereof.

The hydrophilic monomers of the present invention may be macromers of linear or branched poly(ethylene glycol), poly(propylene glycol), or statistically random or block copolymers of ethylene oxide and propylene oxide. The macromer of these polyethers has one reactive group. Non-limiting examples of such reactive groups are acrylates, methacrylates, styrenes, vinyl ethers, acrylamides, methacrylamides, and other vinyl compounds. In one embodiment, the macromer of these polyethers comprises acrylates, methacrylates, acrylamides, methacrylamides, and mixtures thereof. Other suitable hydrophilic monomers will be apparent to one skilled in the art.

The hydrophilic monomers may also comprise charged monomers including but not limited to acrylic acid, methacrylic acid, 3-acrylamidopropionic acid (ACA1), 4-acrylamidobutanoic acid, 5-acrylamidopentanoic acid (ACA2), 3-acrylamido-3-methylbutanoic acid (AMBA), N-vinyloxycarbonyl-α-alanine, N-vinyloxycarbonyl-β-alanine (VINAL), combinations thereof and the like.

The hydrophilic monomers may be selected from N, N-dimethyl acrylamide (DMA), N-vinylpyrrolidone (NVP), 2-hydroxyethyl methacrylate (HEMA), N-vinyl methacetamide (VMA), and N-vinyl N-methyl acetamide (NVA), N-hydroxypropyl methacrylamide, mono-glycerol methacrylate, 2-hydroxyethyl acrylamide, 2-hydroxyethyl methacrylamide, bishydroxyethyl acrylamide, 2,3-dihydroxypropyl (meth)acrylamide and mixtures thereof.

The hydrophilic monomers may be selected from DMA, NVP, HEMA, VMA, NVA, and mixtures thereof.

The hydrophilic monomer(s) (including the hydroxyl alkyl monomers) may be present in amounts up to about 60 wt %, between about 1 to about 60 weight %, between about 5 to about 50 weight %, or about 5 to about 40 weight %, based upon the weight of all reactive components. The silicone hydrogels of the present invention may further comprise at least one wetting agent. As used herein, wetting agents are hydrophilic polymers having a weight average molecular weight greater than about 5,000 Daltons, between about 150,000 Daltons to about 2,000,000 Daltons; between about 300,000 Daltons to about 1,800,000 Daltons; or between about 500,000 Daltons to about 1,500,000 Daltons.

The amount of wetting agent added to the reactive mixtures of the present invention may be varied depending on the other components used and the desired properties of the resulting silicone hydrogel. When present, the internal wetting agents in reactive mixtures may be included in amounts from about 1 weight percent to about 20 weight percent; from about 2 weight percent to about 15 percent, or from about 2 to about 12 percent, all based upon the total weight of all of the reactive components.

Wetting agents include but are not limited to homopolymers, statistically random copolymers, diblock copolymers, triblock copolymers, segmented block copolymers, graft copolymers, and mixtures thereof. Non-limiting examples of internal wetting agents are polyamides, polyesters, polylactones, polyimides, polylactams, polyethers, polyacids homopolymers and copolymers prepared by the free radical polymerization of suitable monomers including acrylates, methacrylates, styrenes, vinyl ethers, acrylamides, methacrylamides, N-vinyllactams, N-vinylamides, O-vinylcarbamates, O-vinylcarbonates, and other vinyl compounds. The wetting agents may be made from any hydrophilic monomer, including those listed herein.

The wetting agents may include acyclic polyamides comprise pendant acyclic amide groups and are capable of association with hydroxyl groups. Cyclic polyamides comprise cyclic amide groups and are capable of association with hydroxyl groups. Examples of suitable acyclic polyamides include polymers and copolymers comprising repeating units of Formula LXXIII or Formula LXXIV:

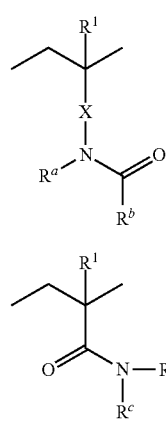

Formula LXXIII

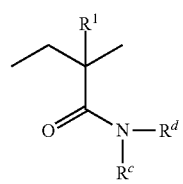

Formula LXXIV wherein X is a direct bond, —(CO)—, or —(CO)—NHR$^e$—, wherein R$^e$ is a $C_1$ to $C_3$ alkyl group; R$^a$ is selected from H, straight or branched, substituted or unsubstituted $C_1$ to $C_4$ alkyl groups; R$^b$ is selected from H, straight or branched, substituted or unsubstituted $C_1$ to $C_4$ alkyl groups, amino groups having up to two carbon atoms, amide groups having up to four carbon atoms, and alkoxy groups having up to two carbon groups; R$^c$ is selected from H, straight or branched, substituted or unsubstituted $C_1$ to $C_4$ alkyl groups, or methyl, ethoxy, hydroxyethyl, and hydroxymethyl; R$^d$ is selected from H, straight or branched, substituted or unsubstituted $C_1$ to $C_4$ alkyl groups; or methyl, ethoxy, hydroxyethyl, and hydroxymethyl wherein the number of carbon atoms in R$^a$ and R$^b$ taken together is 8 or less, including 7, 6, 5, 4, 3, or less, and wherein the number of carbon atoms in R$^c$ and R$^d$ taken together is 8 or less, including 7, 6, 5, 4, 3, or less. The number of carbon atoms in R$^a$ and R$^b$ taken together may be 6 or less or 4 or less. The number of carbon atoms in R$^c$ and R$^d$ taken together may be 6 or less. As used herein substituted alkyl groups include alkyl groups substituted with an amine, amide, ether, hydroxyl, carbonyl, carboxy groups or combinations thereof.

R$^a$ and R$^b$ can be independently selected from H, substituted or unsubstituted $C_1$ to $C_2$ alkyl groups. X may be a direct bond, and R$^a$ and R$^b$ may be independently selected from H, substituted or unsubstituted $C_1$ to $C_2$ alkyl groups.

$R^c$ and $R^d$ can be independently selected from H, substituted or unsubstituted $C_1$ to $C_2$ alkyl groups, methyl, ethoxy, hydroxyethyl, and hydroxymethyl.

The acyclic polyamides of the present invention may comprise a majority of the repeating unit of Formula LXXIII or Formula LXXIV, or the acyclic polyamides can comprise at least about 50 mole % of the repeating unit of Formula LXXIII or Formula LXXIV, including at least about 70 mole %, and at least 80 mole %.

Specific examples of repeating units of Formula LXXIII or Formula LXXIV include repeating units derived from N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, N,N-dimethylacrylamide, methacrylamide and acyclic amides of structures Formula LXXV or Formula LXXVI:

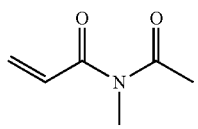

Formula LXXV

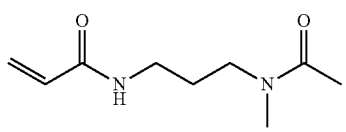

Formula LXXVI

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula LXXVII:

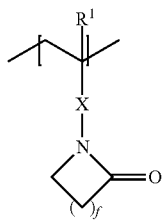

Formula LXXVII wherein f is a number from 1 to 10, X is a direct bond, —(CO)—, or —(CO)—NH—$R^e$—, wherein $R^e$ is a $C_1$ to $C_3$ alkyl group. In Formula LXXVII, f may be 8 or less, including 7, 6, 5, 4, 3, 2, or 1. In Formula LXXVII, f may be 6 or less, including 5, 4, 3, 2, or 1, or may be from 2 to 8, including 2, 3, 4, 5, 6, 7, or 8, or may be 2 or 3.

When X is a direct bond, f may be 2. In such instances, the cyclic polyamide may be polyvinylpyrrolidone (PVP).

The cyclic polyamides of the present invention may comprise 50 mole % or more of the repeating unit of Formula E, or the cyclic polyamides can comprise at least about 50 mole % of the repeating unit of Formula E, including at least about 70 mole %, and at least about 80 mole %.

Specific examples of repeating units of Formula LXXVII include repeating units derived from N-vinylpyrrolidone, which forms PVP homopolymers and vinylpyrrolidone copolymers or N-vinylpyrrolidone substituted with hydrophilic substituents such as phosphoryl choline.

The polyamides may also be copolymers comprising cyclic amide, acyclic amide repeating units or copolymers comprising both cyclic and acyclic amide repeating units. Additional repeating units may be formed from monomers selected from hydroxyalkyl(meth)acrylates, alkyl(meth)acrylates or other hydrophilic monomers and siloxane substituted acrylates or methacrylates. Any of the monomers listed as suitable hydrophilic monomers may be used as comonomers to form the additional repeating units. Specific examples of additional monomers which may be used to form polyamides include 2-hydroxyethylmethacrylate, vinyl acetate, acrylonitrile, hydroxypropyl methacrylate, 2-hydroxyethyl acrylate, methyl methacrylate and hydroxybutyl methacrylate, GMMA, PEGS, and the like and mixtures thereof. Ionic monomers may also be included. Examples of ionic monomers include acrylic acid, methacrylic acid, 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), poly acrylamide, and copolymers and mixtures thereof.

The wetting agents may be made from DMA, NVP, HEMA, VMA, NVA, and combinations thereof. The wetting agents may also be reactive components, as defined herein, by having reactive groups, for example, made by the acylation reaction between pendant hydroxyl groups on HEMA repeating units of an internal wetting agent and methacryloyl chloride or methacryloyl anhydride. Other methods of functionalization will be apparent to one skilled in the art.

Such internal wetting agents are disclosed in U.S. Pat. Nos. 6,367,929, 6,822,016, 7,052,131, 7,666,921, 7,691,916, 7,786,185, 8,022,158, and 8,450,387.

The silicone hydrogels of the present invention may include toughening agents. As previously described, toughening agents are monomers whose corresponding homopolymers exhibit glass transition temperatures higher than 40° C. and when added to the reactive mixture improve the elongation of the resulting silicone hydrogels. Non-limiting examples of such monomers are methyl methacrylate, tert-butyl methacrylate, isobornyl methacrylate, cyclohexyl methacrylate, styrene, substituted styrenes, N-4-vinylbenzyl-N-alkyl acetamides, N-4-vinylbenzyl pyrrolidone, and combinations thereof.

The reaction mixture may contain additional reactive or non-reactive components such as but not limited to, UV absorbers, visible light absorbers, photochromic compounds, pharmaceuticals, nutriceuticals, antimicrobial substances, tints, pigments, copolymerizable and non-polymerizable dyes, release agents and combinations thereof.

Generally the reactive components are mixed in a diluent to form a reaction mixture. Suitable diluents are known in the art. For silicone hydrogels suitable diluents are disclosed in WO 03/022321 and U.S. Pat. No. 6,020,445 the disclosure of which is incorporated herein by reference. Classes of suitable diluents for silicone hydrogel reaction mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like. Aprotic solvents, including amide solvents, hydroxyl substituted, alkyl substituted on amide portion, including cyclic and acyclic amides, including N-methylpyrrolidone, N-ethylpyrrolidone, N, N-dimethyl propionamide, hydroxyethylpyrrolidone, and the like.

Mixtures of diluents may be used. The diluents may be used in amounts up to about 55% by weight of the total of all components in the reaction mixture. More preferably the diluent is used in amounts less than about 45% and more preferably in amounts between about 15 and about 40% by weight of the total of all components in the reaction mixture.

A polymerization initiator is preferably included in the reaction mixture used to form substrates such as contact lenses. Non-limiting initiators include compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and diketones with tertiary amines, mixtures thereof, and the like.

Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998, which is incorporated herein by reference.

The initiator is used in the reaction mixture in effective amounts to initiate polymerization of the reaction mixture typically in amounts from about 0.1 to about 2 weight percent of the reactive mixture. Polymerization of the reaction mixture can be initiated using the appropriate choice of heat, visible light, ultraviolet irradiation, or other means depending on the polymerization initiator used. Alternatively, initiation can be conducted without a photoinitiator using e-beam, for example. However, when a photoinitiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and the preferred method is visible light irradiation. The most preferred photoinitiator is bis(2,4,6-trimethylbenzoyl)-phenyl phosphine oxide (Irgacure 819®).

The reaction mixtures can be formed by any of the methods known to those skilled in the art, such as shaking or stirring, and then used to form polymeric articles or devices by known methods. For example, biomedical devices may be prepared by mixing reactive components and the diluents with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spin casting and static casting. Spin casting methods are disclosed in U.S. Pat. Nos. 3,408,429 and 3,660,545; and static casting methods are disclosed in U.S. Pat. No. 4,113,224 and U.S. Pat. No. 4,197,266. The preferred method for producing contact lenses is by the molding of the silicone hydrogels, which is economical and enables precise control over the final shape of the hydrated lens. For this method, the reaction mixture is placed in a mold having the shape of the final desired silicone hydrogel contact lens, and the reaction mixture is subjected to conditions whereby the monomers polymerize. Subsequently, the molded lens is treated with solvents to remove the diluent and ultimately replace it with water or packaging solution, thereby producing a hydrated silicone hydrogel contact lens. Some diluents may be removed by heat, vacuum or evaporation. In these cases lenses may be mechanically demolded without solvent. This method can be used to form contact lenses and is further described in U.S. Pat. Nos. 4,495,313, 4,680,336, 4,889,664 and 5,039,459 which are herein incorporated by reference.

Biomedical devices, and particularly ophthalmic lenses, have a balance of properties which makes them particularly useful. These properties may be physical, mechanical, or biological in nature. Non-limiting physical properties of a contact lens include haze, water content, oxygen permeability, and contact angle. Non-limiting mechanical properties of a contact lens include Young's modulus, tensile strength, elongation to break, and toughness.

All combinations of the above ranges are deemed to be within the present invention.

For patients with astigmatism, soft contact lenses must be rotationally stabilized in order for the optical correction to be effective. Such stabilization is usually accomplished by the use of stabilization zones on the posterior side of the contact lens that limit rotation. Alternatively, an astigmatic masking lens may be worn in which the lens vaults over the cornea thereby creating a space between the corneal surface and the lens. That space effectively masks the astigmatic properties of the cornea. In order for a soft contact lens to vault over the cornea surface, the central portion of the lens must be stiff enough to maintain the shape required for vaulting without causing patient discomfort at the same time. The present invention is directed to silicone hydrogels that have sufficient stiffness for vaulting at relatively high water contents to form composite soft contact lenses with other silicone hydrogels that are comfortable to wear.

The silicone hydrogels of the present invention may be used to form the unitary contact lenses, or the central region of a composite contact lenses having a central region and a peripheral region. The central region is formed from a silicone hydrogel formed from reactive mixtures comprising at least one N-alkyl methacrylamide, at least one hydrophilic monomer, at least one silicon-containing component, and at least one cross-linking agent, with water contents from about 10 weight percent to about 40 weight percent and moduli from about 15,000 psi to about 200,000 psi and the peripheral region is formed from compositionally distinct silicone hydrogels having water contents of about 10 to about 40 weight percent and moduli from about 20 to about 500 psi.

In another embodiment, a process for making such composite contact lenses is described comprising (a) dosing a first silicone hydrogel formulation of claim 1 into a first mold, (b) partially curing the first silicone hydrogel formulation into a gel, (c) dosing a second silicone hydrogel formulation into the first mold, (d) allowing time for the second silicone hydrogel formulation to imbibe into the gel, (e) placing a second mold on top of the first mold, and (f) fully curing the combination to form the composite contact lens.

The central circular area may be the same size as the optic zone, which in a typical contact lens is about 9 mm or less in diameter. In one embodiment, the central circular area has a diameter of between about 4 and about 7 mm and in another between about 4 and about 6 mm in diameter.

Optionally, the first monomer mixture may be at least partially polymerized through a controlled curing mechanism. Then, a dose of a second monomer mixture, which will form a hydrogel having a modulus of less than about 200 psi, or less than about 150 psi, is dosed on the top of the first monomer mixture. The dose of the second monomer mixture fills the concave front curve to the desired amount and then the base curve is provided and the mold halves are put into their final curing position and the monomer mixtures are cured and/or polymerized completing the molding process. Where the polymerization process includes a photopolymerization mechanism, the radiation, may be directed to either the front curve mold half or the base curve mold half, or both. The molded lens is then extracted to remove the un-desired chemical components and hydrated.

In an alternative method, the first monomer mixture is provided in the center of a front curve mold and then an annular ring of the second monomer mixture is dosed at the edge of the front curve mold. The resultant annular ring of the second reactive mixture is drawn to the center of the front curve by gravity. The base curve mold is then supplied and the curing is initiated and completed and extraction and hydration step(s) proceed to form the final hydrogel contact lens product.

It is desirable to prevent substantial mixing of the first and second monomer mixtures to preserve the desired moduli values in the central and peripheral zones. Increasing the viscosity of the first monomer mixture as compared to the second, peripheral monomer mixture, can reduce molecular diffusion of the monomers when a cure (either partial or full) of the first monomer mixture in the central zone is not utilized. Using a first monomer mixture that has higher viscosity than the clear monomer mixture helps to reduce the shear at the interface of the two monomers mixtures thereby reducing the physical mixing. An analysis of the Stokes-Einstein equation, shown below, illustrates the parameters that affect the diffusivity of a material:

$$D = \frac{kT}{6\pi\mu r}$$

where D is the molecular diffusivity, k the Boltzmann constant, T the temperature, the viscosity and r the radius of the molecule. Operating at lower temperatures and using monomers of higher viscosities tends to reduce the molecular diffusion rate. In one embodiment the viscosity of the first monomer mixture is at least about 1000 cp higher than the viscosity of the peripheral monomer mixture and in another embodiment at least about 1500 cp higher.

However, controlling the viscosity of the monomer mixtures as disclosed in US2003/0142267 was insufficient to provide hydrogel contact lenses having suitable optics and comfort. It has been found that employing a partial or complete cure of the first monomer mixture and balancing the expansion factor of the polymers formed from the first and second monomer mixture hydrogel contact lenses having desirable optics and comfort may be produced. In one embodiment the expansion factors of the polymers formed from the respective monomer mixtures are within about 10% in some embodiments within about 8% and in other embodiments within about 5%. The expansion factor may be adjusted by manipulating a number of formulation variables including the diluent concentration, the concentration and hydrophilicity or hydrophobicity of hydrophilic and hydrophobic components and concentration of initiator and cross-linker, and combinations thereof. It may be desirable to maintain the concentration of the silicone components and replace a part of one of hydrophilic components. In these embodiments, multiple adjustments may be needed to achieve the desired expansion factor.

In addition, other formulation variables may be modified to achieve the desired expansion factor. For example, varying the concentration of the hydrophilic components, the diluent concentration and the initiator concentration, and combinations thereof have been effective at providing photochromic contact lenses having desirable optics and comfort. In one embodiment a wetting agent, such as poly(vinyl pyrrolidone) (PVP), methacrylic acid, polydimethylacrylamide or poly(vinyl methacetamide) may be added to the monomer mixtures. The same or similar components may be used in both the first and second monomer mixtures. For example, it may be desirable to include the same hydrophilic components in both monomer mixtures. In this case, formulation variables in addition to the concentration of hydrophilic components may be varied.

When a single sided cure is used the expansion factor may be matched using monomers, diluent concentration and combinations thereof. Where cure is effected from only one side (such as during photocuring), increasing the initiator concentration may also be desirable.

Test Methods

Standard deviations are shown in parentheses. It will be appreciated that all of the tests specified herein have a certain amount of inherent error. Accordingly, the results reported herein are not to be taken as absolute numbers, but numerical ranges based upon the precision of the particular test.

The water content was measured as follows: lenses to be tested were allowed to sit in packing solution for 24 hours. Each of three test lens were removed from packing solution using a sponge tipped swab and placed on blotting wipes which have been dampened with packing solution. Both sides of the lens were contacted with the wipe. Using tweezers, the test lens were placed in a weighing pan (that was preweighed) and the weight of the wet lenses was obtained. Two more sets of samples were prepared and weighed as above.

The dry weight was measured by placing the sample pans in a vacuum oven which has been preheated to 60° C. for 30 minutes. Vacuum was applied until at least 0.4 inches Hg is attained. The vacuum valve and pump were turned off and the lenses were dried for a minimum of twelve hours. The purge valve was opened and the oven was allowed reach atmospheric pressure. The pans were removed and weighed. The water content was calculated as follows:

Wet weight =
  combined wet weight of pan and lenses − weight of weighing pan

Dry weight = combined dry weight of pan and lenses −
  weight of weighing pan $$\% \text{ water content} = \frac{(\text{wet weight} - \text{dry weight})}{\text{wet weight}} \times 100$$

The average and standard deviation of the water content are calculated for the samples are reported.

Haze was measured by placing a hydrated test lens in borate buffered saline in a clear glass cell at ambient temperature above a flat black background, illuminating from below with a fiber optic lamp (Dolan-Jenner PL-900 fiber optic light with 0.5" diameter light guide) at an angle 66° normal to the lens cell, and capturing an image of the lens from above, normal to the lens cell with a video camera (DVC 1300C:19130 RGB camera or equivalent equipped with a suitable zoom camera lens) placed 14 mm above the lens holder. The background scatter is subtracted from the scatter of the test lens by subtracting an image of a blank cell with borate buffered saline (baseline) using EPIX XCAP V 3.8 software. The value for high end scatter (frosted glass) is obtained by adjusting the light intensity to be between 900 to 910 mean grayscale. The value of the background scatter (BS) is measured using a saline filled glass cell. The subtracted scattered light image is quantitatively analyzed, by integrating over the central 10 mm of the lens, and then comparing to a frosted glass standard. The light intensity/ power setting was adjusted to achieve a mean grayscale value in the range of 900-910 for the frosted glass standard; at this setting, the baseline mean grayscale value was in the range of 50-70. The mean grayscale values of the baseline and frosted glass standard are recorded and used to create a scale from zero to 100, respectively. In the grayscale analysis, the mean and standard deviations of the baseline, frosted glass, and every test lens was recorded. For each lens, a scaled value was calculated according to the equation: scaled value equals the mean grayscale value (lens minus baseline) divided by the mean grayscale value (frosted glass minus baseline) times by 100. Three to five test lenses are analyzed, and the results are averaged.

Water content was measured gravimetrically. Lenses were equilibrated in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours; typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows:

$$\% \text{ water content} = \frac{(\text{wet weight} - \text{dry weight})}{\text{wet weight}} \times 100$$

The average and standard deviation of the water content were calculated and the average value reported as the percent water content of the test lens.

The refractive index (RI) of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (+/−0.2° C.). The prism assembly was opened and the test lens placed on the lower prism between the magnetic dots closest to the light source. If the prism is dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Oxygen permeability (Dk) was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm. The calculations for a 7.8 mm radius sensor and 10% (v/v) air flow are as follows:

$Dk/t$=(measured current−dark current)×(2.97×10$^{-8}$ mL O$_2$/(μA-sec-cm$^2$-mm Hg)

The edge correction was related to the Dk of the material. For all Dk values less than 90 barrers:

$t/Dk$(edge corrected)=[1+(5.88×$t$)]×($t/Dk$)

For Dk values between 90 and 300 barrers:

$t/Dk$(edge corrected)=[1+(3.56×$t$)]×($t/Dk$)

For Dk values greater than 300 barrers:

$t/Dk$(edge corrected)=[1+(3.16×$t$)]×($t/Dk$)

Non-edge corrected Dk was calculated from the reciprocal of the slope obtained from the linear regression analysis of the data wherein the x variable was the center thickness in centimeters and the y variable was the t/Dk value. On the other hand, edge corrected Dk was calculated from the reciprocal of the slope obtained from the linear regression analysis of the data wherein the x variable was the center thickness in centimeters and the y variable was the edge corrected t/Dk value. The resulting Dk value was reported in barrers.

Wettability of lenses was determined using the methods below. Dynamic contact angle (DCA) was determined by a Wilhelmy plate method using a Cahn DCA-315 instrument at room temperature and using deionized water as the probe solution. The experiment was performed by dipping the lens specimen of known parameter into the packing solution of known surface tension while measuring the force exerted on the sample due to wetting by a sensitive balance. The advancing contact angle of the packing solution on the lens is determined from the force data collected during sample dipping. The receding contact angle is likewise determined from force data while withdrawing the sample from the liquid. The Wilhelmy plate method is based on the following formula: Fg=γρ cos θ−B, wherein F=the wetting force between the liquid and the lens (mg), g=gravitational acceleration (980.665 cm/sec$^2$), γ=surface tension of probe liquid (dyne/cm), ρ=the perimeter of the contact lens at the liquid/lens meniscus (cm), θ=the dynamic contact angle (degree), and B=buoyancy (mg). B is zero at the zero depth of immersion. Four test strips were cut from the central area of the contact lens. Each strip was approximately 5 mm in width and equilibrated in packing solution. Then, each sample was cycled four times, and the results were averaged to obtain the advancing and receding contact angles of the lens.

In some Examples, wettability of lenses was determined using a sessile drop technique measured using KRUSS DSA-100™ instrument at room temperature and using DI water as probe solution. The lenses to be tested (3-5/sample) were rinsed in DI water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a −1.00 power lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample (Lo) and sample length at break (Lf) were measured. At least five specimens of each composition were measured, and the average values were used to calculate the percent elongation to break: percent elongation=[(Lf−Lo)/Lo]×100. The tensile modulus was calculated as the slope of the initial linear portion of the stress-strain curve; the units of modulus are pounds per square inch or psi. The tensile strength was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in$^3$.

Samples cast as flats were also measured by Instron testing; however, the test articles were prepared from flat circular plastic molds (diameter about 15 mm) similar to the molds used to make contact lenses but without curvature to produce flat round disks. The molds were designed to make disks with center thicknesses between 250 and 550 microns, depending on the volume of reactive monomer mixture dosed. The disks were cut to the desired sample size (width: 3.1 mm; length: about 7 mm). The crosshead of a constant rate-of-movement type-testing machine was equipped with a 100 Newton load cell and pneumatic action grips (250 Newton maximum) with diamond serrated jaw faces. The specimen was loaded into the grips and then elongated at 1 inch per minute until it breaks. The tensile properties are obtained from the resulting stress-strain curve. Additionally, for all mechanical testing experiments, samples were stored in packing solution until immediately before the analysis to minimize the effects of dehydration.

Center thickness was measured using an electronic thickness gauge.

OCT Test Method:

A model eye was manufactured from PMMA for the purpose of testing prototype lens designs for corneal masking in vitro. The model eye was designed to have approximately 1.80 diopters of corneal astigmatism, with principal meridian curvatures of 7.688 mm and 8.016 mm for the steep and flat meridians, respectively. The prototype lens design was placed onto the model eye with a saline solution between the lens and eye surface acting as surrogate for tears. A Bioptigen Envisu Optical Coherence Tomographer (OCT, model R2310) with a 20 mm objective lens was used to image the prototype lens and model eye system to determine if a volume of saline was visible between the model surface and lens back surface. As can be seen in the FIGURE below, the OCT image confirmed the presence of a tear volume between the model eye and lens back surface, indicating the lens successfully vaulted the model corneal surface.

The following abbreviations will be used throughout the Examples

BC: back curve plastic mold
FC: front curve plastic mold
NVP: N-vinylpyrrolidone (Acros Chemical)
DMA: N,N-dimethylacrylamide (Jarchem)
HEMA: 2-hydroxyethyl methacrylate (Bimax)
NMMA: N-methyl methacrylamide
VMA: N-vinyl N-methyl acetamide (Aldrich)
Blue HEMA: 1-amino-4-[3-(4-(2-methacryloyloxy-ethoxy)-6-chlorotriazin-2-ylamino)-4-sulfophenylamino]anthraquinone-2-sulfonic acid, as described in Example 4 of U.S. Pat. No. 5,944,853
Styryl-TRIS: tris(trimethylsiloxy)silyl styrene
pVMA: poly(N-vinyl N-methyl acetamide)
PVP: poly(N-vinylpyrrolidone) K90 (ISP Ashland)
EGDMA: ethylene glycol dimethacrylate (Esstech)
TEGDMA: triethylene glycol dimethacrylate (Esstech)
TMPTMA: trimethylolpropane trimethacrylate (Esstech)
BMPP: 2,2-bis(4-methacryloxyphenyl)-propane (PolySciences)
BAPP: 2,2-bis[4-(2-acryloxyethoxy)phenyl]propane (PolySciences)
BHMPP: 2,2-bis[4-(2-hydroxy-3-methacryloxypropoxy)phenyl]propane (PolySciences) Tegomer V-Si 2250: diacryloxypolydimethylsiloxane, having 20 average dimethyl siloxy repeating units (Evonik)
D3O: 3,7-dimethyl-3-octanol (Vigon)
Irgacure 819: bis(2,4,6-trimethylbenzoyl)-phenylphosphineoxide
Irgacure 1870: blend of bis(2,6-dimethoxybenzoyl)-2,4,4-trimethyl-pentylphosphineoxide and 1-hydroxy-cyclohexyl-phenyl-ketone
mPDMS: monomethacryloxypropyl terminated mono-n-butyl terminated polydimethylsiloxane, (800-1000 MW) (Gelest)
HO-mPDMS: mono-(2-hydroxy-3-methacryloxypropyl)-propyl ether terminated mono-n-butyl terminated polydimethylsiloxane (400-1000 MW) (DSM)
SiMAA: 2-propenoic acid, 2-methyl-2-hydroxy-3-[3-[1,3,3,3-tetramethyl-1-[(trimethylsilyl)oxy]disiloxanyl]propoxy] propyl ester (Toray)
SA2: N-(2,3-dihydroxylpropyl) N-(3-tetra(dimethylsiloxy) dimethylbutylsilane)propyl) acrylamide
TAM: t-amyl alcohol (BASF)
3E3P: 3-ethyl 3-pentanol
DI water: deionized water
IPA: isopropyl alcohol
Norbloc: 2-(2'-hydroxy-5-methacrylyloxyethylphenyl)-2H-benzotriazole (Janssen)
PP: polypropylene
Zeonor: polycycloolefin thermoplastic polymer (Nippon Zeon Co Ltd)
Borate Buffer: a solution prepared by dissolving 8.3 gm NaCl (from Sigma Aldrich), 9.1 gm boric acid (from Mallinckrodt) and 1 gm sodium borate (from Mallinckrodt) in 1 L deionized water (from Milli Q).

Synthetic Example 1: Preparation of Poly(N-vinyl N-methyl acetamide) (pVMA)

380 mL (3.48 mol) of distilled N-vinyl-N-methyl acetamide and 187 mg (1.14 mmol) of azobisisobutyronitrile were added to a 3-neck round bottom flask fitted with reflux condenser, magnetic stirring bar and thermocouple and purged of oxygen gas for 2 hours by bubbling nitrogen gas through the reaction mixture. Then, the reaction mixture was heated at 75° C. for 24 hours during which time the reaction mixture solidified. The reaction product was quenched in air and isolated by work-up procedure 1 or work-up procedure 2. Work-up Procedure 1: The reaction product was dissolved in 800 mL of methylene chloride at 40° C. and cooled to room temperature. The solution was poured into 2 L of cold diethyl ether with manual stirring to afford a white solid after decanting off the solvents. The solid product was air dried followed by vacuum drying overnight at 50° C. The precipitated product was ground into a fine white powder and vacuum dried overnight at 50° C. (85% yield). Work-up Procedure 2: The reaction product was dissolved in water and dialyzed extensively in dialysis membrane tubing (Spectra Pore MWCO 3500) and freeze dried (LABCONCO, Freezone® Triad™ freeze dry system, Model #7400030) or spray dried (BUCHI mini spray dryer, Model # B-290). The molecular weight was determined by Size Exclusion Chromatography with Multi-Angle Light Scattering (SEC-MALS). The SEC-MALS setup employed methanol (with 10 mM LiBr) as the mobile phase at a flow rate of 0.6 mL/min at 50° C. Three Tosoh Biosciences TSK-gel columns in series were used [SuperAW3000 4 um, 6.0 mm ID×15 cm (PEO/DMF Exclusion Limit=60,000 g/mole), SuperAW4000 6 um, 6.0 mm ID×15 cm (PEO/DMF Exclusion Limit=400,000 g/mole) and a SuperAW5000 7 um, 6.0 mm ID×15 cm (PEO/DMF Exclusion Limit=4,000,000 g/mole)] with an online Agilent 1200 UV/VIS diode array detector, a Wyatt Optilab rEX interferometric refractometer, and a Wyatt miniDAWN Treos multiangle laser scattering (MALS) detector ($\lambda$=658 nm). A d$\eta$/dc value of 0.1829 mL/g at 30° C. ($\lambda$=658 nm) was used for absolute molecular weight determination. Absolute molecular weights and polydispersity data were calculated using the Wyatt ASTRA 6.1.1.17 SEC/LS software package. The weight average molecular weight typically varied from about 500 KDa to about 700 KDa, and the polydispersity varied from about 1.8 to about 2.8.

Comparative Examples 1-12 and Examples 1-5

Each reactive mixture was formed by mixing the reactive components listed in Tables 1 and 2 and then degassed by applying vacuum at ambient temperature for about 20 minutes. In a glove box with a nitrogen gas atmosphere and less than 0.1 percent oxygen gas, about 100 µL of the reactive mixture was then dosed at room temperature into the FC made from Zeonor. The BC, made from 55:45 (w/w) blend of Zeonor:polypropylene, was placed on the front curve mold. The molds were equilibrated for a minimum of twelve hours in the glove box prior to dosing. The tray was transferred into an adjacent glove box maintained at 50-60° C., and the lenses were cured from the bottom for 20 minutes using TLO3 fluorescent bulbs having intensity of 4-5 mW/cm$^2$.

The lenses were manually de-molded with most lenses adhering to the BC and released using 70-50% IPA, followed by washing two times with 70-25% IPA for about 0.5-2.0 hours, DI water for about one hour, and finally two times with borate buffered packaging solution for about 30 minutes. The lenses were sterilized by autoclaving at 122° C. for 30 minutes. The physical and mechanical properties of the sterile lenses were measured and are listed in Table 3.

TABLE 1

| Component | CE1 | CE2 | CE3 |
|---|---|---|---|
| OH-mPDMS n = 4 | 0 | 0 | 0 |
| mPDMS 1000 | 0 | 0 | 0 |
| DMA | 65.25 | 32.62 | 0 |
| NMMA | 0 | 32.63 | 65.25 |
| HEMA | 30 | 30 | 30 |
| TEGDMA | 2.5 | 2.5 | 2.5 |
| Norbloc | 1.75 | 1.75 | 1.75 |
| CGI 819 | 0.5 | 0.5 | 0.5 |
| Diluent | 20 | 20 | 20 |
| TAM | 100 | 100 | 100 |

| Ex# | [NMMA] | [DMA] | Mod (psi) |
|---|---|---|---|
| 2 | 11.5 | 0 | 53 (5) |
| 3 | 23.3 | 0 | 103 (8) |
| 4 | 35.15 | 0 | 223 (32) |
| 5 | 46.65 | 0 | 365 (77) |
| CE9 | 0 | 11.5 | 46 (6) |
| CE10 | 0 | 23.3 | 53 (6) |
| CE11 | 0 | 35.15 | 66 (6) |
| CE12 | 0 | 46.65 | 87 (10) |

TABLE 2

| Component | Ex. 1 | CE4 | CE5 | Ex 2 | Ex 3 | Ex. 4 | Ex. 5 | CE6 | CE7 | CE8 | CE9 | CE10 | CE11 | CE12 |
|---|---|---|---|---|---|---|---|---|---|---|---|---|---|---|
| OH-mPDMS n = 4 | 40 | 40 | 16.5 | 16.5 | 16.5 | 16.5 | 16.5 | 16.5 | 16.5 | 16.5 | 16.5 | 16.5 | 16.5 | 16.5 |
| mPDMS 1000 | 0 | 0 | 27.5 | 27.5 | 27.5 | 27.5 | 27.5 | 27.5 | 27.5 | 27.5 | 27.5 | 27.5 | 27.5 | 27.5 |
| NVP | 0 | 0 | 46.65 | 35.15 | 23.35 | 11.50 | 0 | 44.15 | 41.65 | 39.15 | 35.15 | 23.35 | 11.5 | 0 |
| DMA | 0 | 50.5 | 0 | 0 | 0 | 0 | 0 | 2.5 | 5.0 | 7.5 | 11.5 | 23.30 | 35.15 | 46.65 |
| NMMA | 50 | 0 | 0 | 11.5 | 23.3 | 35.15 | 46.65 | 0 | 0 | 0 | 0 | 0 | 0 | 0 |
| HEMA | 6.75 | 6.75 | 6.75 | 6.75 | 6.75 | 6.75 | 6.75 | 6.75 | 6.75 | 6.75 | 6.75 | 6.75 | 6.75 | 6.75 |
| EGDMA | 1 | 0.5 | 0.35 | 0.35 | 0.35 | 0.35 | 0.35 | 0.35 | 0.35 | 0.35 | 0.35 | 0.35 | 0.35 | 0.35 |
| Norbloc | 2 | 2 | 1.75 | 1.75 | 1.75 | 1.75 | 1.75 | 1.75 | 1.75 | 1.75 | 1.75 | 1.75 | 1.75 | 1.75 |
| CGI 819 | 0.25 | 0.25 | 0.5 | 0.5 | 0.5 | 0.5 | 0.5 | 0.5 | 0.5 | 0.5 | 0.5 | 0.5 | 0.5 | 0.5 |
| Diluent | 0 | 0 | 10 | 10 | 10 | 10 | 10 | 10 | 10 | 10 | 10 | 10 | 10 | 10 |
| TAM | 100 | 100 | 100 | 100 | 100 | 100 | 100 | 100 | 100 | 100 | 100 | 100 | 100 | 100 |

TABLE 3

| Example # | % Water | % Haze | DCA | Mechanicals Mod. (psi) | Elong. (%) | $D_k$ |
|---|---|---|---|---|---|---|
| CE1 | 81 (1) | 2 (0) | 67 (4) | 39 (7) | 63 (30) | 47 |
| CE 2 | 83 (0) | 2 (1) | 83 (8) | 16 (3) | 93 (45) | 49 |
| CE3 | 79 (0) | NT | 113 (13) | 20 (3) | 74 (25) | NT |
| Ex. 1 | 65 (0) | 51 (13) | 77 (12) | 316 (18) | 204 (45) | 50 |
| CE4 | 60 (0) | 5 (1) | 127 (14) | 54 (7) | 227 (52) | 49 |
| CE5 | 61 (0) | 6 (1) | 48 (6) | 75 (10) | 145 (57) | 92 |
| Ex 2 | 63 (0) | 7 (0) | 116 (9) | 53 (5) | 250 (49) | 85 |
| Ex 3 | 60 (0) | 7 (0) | 112 (7) | 103 (8) | 242 (43) | 75 |
| Ex 4 | 59 (0) | 7 (1) | 109 (8) | 223 (32) | 194 (36) | 57 |
| Ex 5 | 60 (0) | 50 (32) | 95 (7) | 365 (77) | 118 (15) | 48 |
| CE6 | 61 (0) | 6 (1) | 48 (6) | 75 (10) | 145 (57) | 92 |
| CE7 | 63 (0) | 7 (1) | 79 (9) | 57 (6) | 171 (36) | 89 |
| CE8 | 63 (0) | 9 (1) | 107 (3) | 52 (4) | 164 (53) | 89 |
| CE9 | 63 (0) | 9 (1) | 110 (4) | 46 (6) | 162 (45) | 89 |
| CE10 | 60 (0) | 6 (1) | 119 (15) | 53 (6) | 184 (56) | 85 |
| CE11 | 56 (0) | 4 (0) | 114 (13) | 66 (6) | 195 (44) | 72 |
| CE12 | 54 (0) | 4 (1) | 107 (5) | 87 (10) | 211 (56) | 56 |

The comparative Examples contain no NMMA and have moduli less than about 90 psi. Surprisingly, replacing either DMA or NVP with NMMA results in dramatically increased modulus values. For example, replacing the NVP in Comparative Example 5 with NMMA (46.65%, Ex. 5), increased the modulus from 75 psi to 365 psi. Similarly, replacing the DMA from Comparative Examples 9-12 with NMMA also showed dramatic increases in modulus, particularly in concentrations of about 20% or greater as shown in Table 4 below. The increases in modulus values ranged from 10% at 11.5 wt % NMMA to over 300% at 46.65 wt % NMMA. Water content for Examples 2-5 remained between 59 and 63%, and clarity was acceptable in Examples 2-5.

Examples 6-16

Each reactive mixture was formed by mixing the reactive components listed in Table 4 and then degassed by applying vacuum at ambient temperature for about 20 minutes. In a glove box with a nitrogen gas atmosphere and less than 0.1 percent oxygen gas, about 100 µL of the reactive mixture was then dosed at room temperature into the FC made from a 90:10 (w/w) blend of Zeonor:polypropylene. The BC made from polypropylene was then placed on the front curve mold. A quartz plate was placed on top of a tray of eight such mold assemblies to maintain proper fitting. The molds were equilibrated for a minimum of twelve hours in the glove box prior to dosing. The tray was transferred into an adjacent glove box maintained at 60-65° C., and the lenses were cured from the top for 12 minutes using TLO3 fluorescent bulbs having intensity of 4-5 mW/cm².

The lenses were manually de-molded with most lenses adhering to the BC and released using 70-50% IPA, followed by washing two times with 70-25% IPA for about 0.5-2.0 hours, DI water for about one hour, and finally two times with borate buffered packaging solution for about 30 minutes. The lenses were sterilized by autoclaving at 122° C. for 30 minutes. The physical and mechanical properties of the sterile lenses were measured and are listed in Table 5.

TABLE 4

| Component | Ex 6 | Ex 7 | Ex 8 | Ex 9 | Ex 10 | Ex 11 | Ex 12 | CEx 13 | Ex 13 | Ex 14 | Ex 15 | Ex 16 |
|---|---|---|---|---|---|---|---|---|---|---|---|---|
| OH-mPDMS n = 4 | 60 | 60 | 55 | 52.5 | 50 | 47.5 | 45 | 45 | 42.5 | 21.75 | 17.5 | 12.5 |
| OH-mPDMS n = 15 | 0 | 0 | 0 | 0 | 0 | 0 | 0 | 0 | 0 | 21.25 | 25 | 30 |
| NMMA | 7.5 | 7.5 | 7.5 | 7.5 | 7.5 | 10 | 12.5 | 0 | 15 | 15 | 15 | 15 |
| DMA | 0 | 0 | 0 | 0 | 0 | 0 | 0 | 12.5 | 0 | 0 | 0 | 0 |
| HEMA | 15 | 16.98 | 16.98 | 16.98 | 16.98 | 16.98 | 16.98 | 16.98 | 16.98 | 16.98 | 16.98 | 16.98 |
| pVMA (507 KDa) | 12 | 10 | 10 | 10 | 10 | 10 | 10 | 10 | 10 | 10 | 10 | 10 |
| Tegomer 2250 | 0 | 0 | 5 | 7.5 | 10 | 10 | 10 | 10 | 10 | 10 | 10 | 10 |
| TEGDMA | 3.5 | 3.5 | 3.5 | 3.5 | 3.5 | 3.5 | 3.5 | 3.5 | 3.5 | 3.5 | 3.5 | 3.5 |
| Norbloc | 1.75 | 1.75 | 1.75 | 1.75 | 1.75 | 1.75 | 1.75 | 1.75 | 1.75 | 1.75 | 1.75 | 1.75 |
| CGI 819 | 0.25 | 0.25 | 0.25 | 0.25 | 0.25 | 0.25 | 0.25 | 0.25 | 0.25 | 0.25 | 0.25 | 0.25 |
| Blue HEMA | 0.02 | 0.02 | 0.02 | 0.02 | 0.02 | 0.02 | 0.02 | 0.02 | 0.02 | 0.02 | 0.02 | 0.02 |
| Diluent | 23 | 23 | 23 | 23 | 23 | 23 | 23 | 23 | 23 | 23 | 23 | 23 |
| D3O | 100 | 100 | 100 | 100 | 100 | 100 | 100 | 100 | 100 | 100 | 100 | 100 |

TABLE 5

| Example # | % Water | % Haze | DCA (degree) | $D_k$ | CT (μm) | Mechanicals | | | Elong. (%) | RI |
|---|---|---|---|---|---|---|---|---|---|---|
| | | | | | | Modulus | TS (psi) | Toughness | | |
| Ex. 6 | 30.7 | 120 | 75 | 126 | 122 | 1560 | 421 | 320 | 103 | NA |
| Ex. 7 | 26.4 | 49 | 98 | 117 | 118 | 1785 | 449 | 312 | 96 | 1.4398 |
| Ex. 8 | 25.6 | 18 | 75 | 122 | 117 | 1579 | 494 | 332 | 105 | 1.4492 |
| Ex. 9 | 24.2 | 10 | 73 | 123 | 110 | 1551 | 494 | 320 | 98 | 1.4440 |
| Ex. 10 | 22.8 | 7 | 62 | 101 | 113 | 1411 | 464 | 250 | 88 | 1.4440 |
| Ex. 11 | 27.1 | 8 | 59 | 113 | 106 | 1375 | 502 | 365 | 116 | NA |
| Ex. 12 | 29.1 | 10 | 65 | 97 | 114 | 1279 | 397 | 222 | 91 | 1.4418 |
| Comp. Ex. 13 | 29.1 | 5 | 23 | 107 | 110 | 385 | 182 | 106 | 101 | 1.439 |
| Ex. 13 2995-12-A3 flats | 30.7 | 8 | 70 | 92 | 111 | 1176 1296 | 413 | 342 | 117 | 1.4332 |
| Ex. 14 2995-17-A flats | 33.2 | 21 | 33 | 121 | 117 | 700 939 | 300 | 242 | 128 | 1.4332 |
| Ex. 15 | 33 | 21 | 31 | 120 | 109 | 678 | 303 | 259 | 135 | 1.4331 |
| Ex. 16 | 33.5 | 23 | 41 | 133 | 119 | 612 | 278 | 229 | 134 | 1.4319 |

Examples 6-10 include the same amount of NMMA (%), but increasing amounts of a silicone containing crosslinker, Tegomer. The addition of a silicone containing crosslinker, even in small amounts, reduced the % haze from 120% to between 10-50%. Examples 6-11 displayed moduli over 1000 psi, Dk over 100 barrer, and water contents between 20 and about 34%. Comparative Example 13 contained DMA instead of NMMA and had a modulus of 385 psi, much lower than Example 12, which contained NMMA and had a modulus of 1279 psi. Example 12 also displayed increased toughness, and tensile strength, and nearly the same elongation, as Comparative Example 13.

Examples 17-26

Each reactive mixture was formed by mixing the reactive components listed in Table 6, filtering through a 3 μm filter using a heated or unheated stainless steel or glass syringe, and then degassed by applying vacuum at ambient temperature for about 15 minutes. In a glove box with a nitrogen gas atmosphere and less than 0.1 percent oxygen gas, 75-100 μL of the reactive mixture was then dosed at room temperature into the FC. The BC was then placed on the front curve mold. The molds were equilibrated for a minimum of twelve hours in the glove box prior to dosing. The tray was transferred into an adjacent glove box maintained at 60-65° C., and the lenses were cured from the top for 20 minutes using TLO3 fluorescent bulbs having intensity of 4-5 mW/cm$^2$. The light source was about six inches above the trays. A detailed description of the curing process and apparatus can be found in U.S. Pat. No. 8,937,110.

The lenses were manually de-molded with most lenses adhering to the FC and released by suspending the 64 lenses in about one liter of aqueous IPA solution for about one or two hours, followed by washing with another aqueous IPA solution, two times with DI, and finally two times with borate buffered packaging solution. The concentrations of the aqueous IPA solutions are listed in Table 6. Each washing step lasted about 30 minutes. The lenses were sterilized by autoclaving at 122° C. for 30 minutes. The physical and mechanical properties of the sterile lenses were measured and are listed in Table 7.

TABLE 6

| Component | Ex 17 | Ex 18 | Ex 19 | Ex 20 | Ex 21 | Ex 22 | Ex 23 | Ex 24 | Ex 25 | Ex 26 |
|---|---|---|---|---|---|---|---|---|---|---|
| OH-mPDMS n = 4 | 43.2 | 43 | 42.75 | 42.5 | 43.5 | 41.5 | 41.5 | 41.5 | 43.5 | 43.5 |
| NMMA | 15 | 15 | 15 | 15 | 15 | 15 | 15 | 15 | 15 | 15 |
| HEMA | 16.98 | 16.98 | 16.98 | 16.98 | 16.98 | 16.98 | 14.48 | 12 | 13.98 | 13.98 |
| pVMA (507 KDa) | 10 | 10 | 10 | 10 | 7 | 7 | 7 | 7 | 10 | 10 |
| Tegomer 2250 | 10.7 | 10.5 | 10.25 | 10 | 10 | 10 | 10 | 10 | 10 | 10 |
| EGDMA | 2.1 | 2.5 | 3 | 3.5 | 5.5 | 7.5 | 7.5 | 7.5 | 5.5 | 7.5 |
| Norbloc | 1.75 | 1.75 | 1.75 | 1.75 | 1.75 | 1.75 | 1.75 | 1.75 | 1.75 | 1.75 |
| TMPTMA | 0 | 0 | 0 | 0 | 0 | 0 | 2.5 | 4.98 | 0 | 0 |
| CGI 819 | 0.25 | 0.25 | 0.25 | 0.25 | 0.25 | 0.25 | 0.25 | 0.25 | 0.25 | 0.25 |
| Blue HEMA | 0.02 | 0.02 | 0.02 | 0.02 | 0.02 | 0.02 | 0.02 | 0.02 | 0.02 | 0.02 |
| Diluent | 23 | 23 | 23 | 23 | 23 | 23 | 23 | 23 | 23 | 23 |
| D3O | 100 | 100 | 100 | 100 | 100 | 100 | 100 | 100 | 100 | 100 |
| FC | Z | Z | Z | Z | 9:1 Z:TT | 9:1 Z:TT | 9:1 Z:TT | 9:1 Z:TT | 9:1 Z:TT | 9:1 Z:TT |
| BC | Z | Z | Z | Z | PP | PP | PP | PP | PP | PP |
| % IPA release | 40 | 40 | 40 | 40 | 40 | 40 | 40 | 40 | 40 | 40 |
| % IPA wash | 70 | 70 | 70 | 70 | 50 | 50 | 50 | 50 | 50 | 50 |

TABLE 7

| Example # | Sessile | | | | | Mechanicals | | | | |
|---|---|---|---|---|---|---|---|---|---|---|
| | % Water | % Haze | Drop (degree) | $D_k$ | CT (μm) | Modulus (psi) | TS (psi) | Toughness | Elong. (%) | RI |
| Ex. 17 | 28.6 | 7 | 34 | 96 | 121 | 1727 | 469 | 236 | 80 | 1.4435 |
| Ex. 18 | 27.8 | 8 | 32 | 102 | 125 | 1907 | 498 | 238 | 76 | 1.4459 |
| Ex. 18 Flats | NM | NM | NM | NM | NM | 2287 | NM | NM | NM | NM |
| Ex. 19 | 27 | 4 | 44 | 93 | 122 | 2145 | 476 | 152 | 55 | 1.4467 |
| Ex. 19 Flats | NM | NM | NM | NM | 332 | 5038 | 279 | 14 | 11 | NM |
| Ex. 20 | 26.5 | 5 | 39 | 85 | 133 | 2415 | 441 | 103 | 46 | 1.4467 |
| Ex. 21 | 18.6 | 2 | 41 | 83 | NM | NM | NM | NM | NM | 1.454 |
| Ex. 22 | 17.5 | 4 | 39 | 96 | 187 | 3030 | 250 | 14 | 262 | 1.4605 |
| Ex. 22 Flats | NM | NM | NM | NM | NM | 7794 | NM | NM | NM | NM |
| Ex. 22 | NM | NM | NM | NM | 537 | 3898 | 115 | 0.8 | 8.5 | |
| Ex. 23 | 14.3 | 4 | 28 | 58 | NM | NM | NM | NM | NM | NM |
| Ex. 24 | 12.9 | 3 | 29 | 50 | 298 | 17399 | 292 | 2 | 5 | 1.468 |
| Ex. 25 | 21.2 | 4 | 55 | 111 | 555 | 4251 | 88 | 0.7 | 7.1 | NM |
| Ex. 26 | 19.2 | 4 | 41 | 93 | 547 | 6588 | 141 | 6.3 | 1.4 | NM |

Formulations of the present invention provide a wide range of moduli. By varying the concentration and type of crosslinker (such as including a short chain, higher functionality crosslinker, such as TMTPA), moduli up to about 20,000 psi can be achieved.

Examples 27-41

Each reactive mixture was formed by mixing the reactive components listed in Tables 8 and 9 and then degassed by applying vacuum at ambient temperature for about 20 minutes. In a glove box with a nitrogen gas atmosphere and less than 0.1 percent oxygen gas, about 100 μL of the reactive mixture was then dosed at room temperature into the FC made from made from the materials shown in Tables 8 and 9. The BC made from the materials shown in Tables 8 and 9 was then placed on the front curve mold. A quartz plate was placed on top of a tray of eight such mold assemblies to maintain proper fitting. The molds were equilibrated for a minimum of twelve hours in the glove box prior to dosing. The tray was transferred into an adjacent glove box maintained at 60-65° C., and the lenses were cured for 12 minutes from the top using TLO3 fluorescent bulbs having intensity of 4-5 mW/cm².

The lenses were manually de-molded with most lenses adhering to the BC and released using 40% IPA, followed by washing two times with 40% IPA for about 0.5 to 1 hour except as noted in the tables, two times with DI water for about 0.5 to 1 hour, and finally two times with borate buffered packaging solution for about 30 minutes. The lenses were sterilized by autoclaving at 122° C. for 30 minutes. The physical and mechanical properties of the sterile lenses were measured and are listed in Table 10.

TABLE 8

| Component | Ex27 | Ex28 | Ex29 | Ex30 | Ex31 | Ex32 | Ex33 | Ex34 |
|---|---|---|---|---|---|---|---|---|
| SiMAA | 42.8 | 21.4 | 21.4 | 0 | 0 | 0 | 0 | 0 |
| Styryl TRIS | 0 | 0 | 21.4 | 42.8 | 42.8 | 42.8 | 42.8 | 42.8 |
| TRIS | 0 | 21.4 | 0 | 0 | 0 | 0 | 0 | 0 |
| NMMA | 15 | 15 | 15 | 15 | 15 | 15 | 15 | 18 |
| HEMA | 16.98 | 16.98 | 16.98 | 17 | 16.98 | 16.89 | 16.98 | 16.98 |
| pVMA (507 KDa) | 10 | 10 | 10 | 0 | 0 | 0 | 7 | 7 |
| pVMA (617 KDa) | 0 | 0 | 0 | 10 | 10 | 0 | 0 | 0 |
| pVMA (700 KDa) | 0 | 0 | 0 | 0 | 0 | 10 | 0 | 0 |

TABLE 8-continued

| Component | Ex27 | Ex28 | Ex29 | Ex30 | Ex31 | Ex32 | Ex33 | Ex34 |
|---|---|---|---|---|---|---|---|---|
| Tegomer 2250 | 10.2 | 10.2 | 10.2 | 10.2 | 10.2 | 10.2 | 13.2 | 10.2 |
| EGDMA | 3 | 3 | 3 | 3 | 3 | 3 | 3 | 3 |
| Norbloc | 1.75 | 1.75 | 1.75 | 1.75 | 1.75 | 1.75 | 1.75 | 1.75 |
| TMPTMA | 0 | 0 | 0 | 0 | 0 | 0 | 2.5 | 4.98 |
| CGI 819 | 0.25 | 0.25 | 0.25 | 0.25 | 0 | 0 | 0.25 | 0.25 |
| CGI 1870 | 0 | 0 | 0 | 0 | 0.34 | 0.34 | 0 | 0 |
| Blue HEMA | 0.02 | 0.02 | 0.02 | 0 | 0.02 | 0.02 | 0.02 | 0.02 |
| FC | 9:1 Z:TT | 9:1 Z:TT | 9:1 Z:TT | 9:1 Z:TT | Z | 9:1 Z:TT | 9:1 Z:TT | 9:1 Z:TT |
| BC | PP | PP | PP | PP | 55:45 Z:PP | PP | PP | PP |
| % IPA Wash | 40 | 40 | 40 | 40 | 40 | 40 | None | None |
| Diluent | 23 | 23 | 23 | 23 | 23 | 23 | 23 | 23 |
| D3O | 100 | 100 | 100 | 100 | 100 | 100 | 100 | 100 |

TABLE 9

| Component | Ex 35 | Ex 36 | Ex 37 | Ex 38 | Ex 39 | Ex 40 | Ex 41 |
|---|---|---|---|---|---|---|---|
| SiMAA | 21.4 | 0 | 0 | 0 | 0 | 0 | 0 |
| Styryl TRIS | 21.4 | 42.8 | 42.8 | 42.8 | 44.8 | 44.3 | 43.8 |
| NMMA | 15 | 15 | 12.5 | 10.5 | 15 | 15 | 15 |
| HEMA | 16.98 | 16.98 | 16.98 | 16.98 | 16.98 | 16.98 | 16.98 |
| DMA | 0 | 0 | 2 | 4 | 0 | 0 | 0 |
| pVMA (507 KDa) | 0 | 0 | 10 | 10 | 10 | 10 | 10 |
| PVP K90 | 10 | 10 | 0 | 0 | 0 | 0 | 0 |
| Tegomer 2250 | 10.2 | 10.2 | 10.2 | 10.2 | 10.2 | 10.2 | 10.2 |
| EGDMA | 3 | 3 | 3.5 | 3.5 | 1 | 1.5 | 2 |
| Norbloc | 1.75 | 1.75 | 1.75 | 1.75 | 1.75 | 1.75 | 1.75 |
| CGI 819 | 0.25 | 0.25 | 0.25 | 0.25 | 0.25 | 0.25 | 0.25 |
| Blue HEMA | 0.02 | 0.02 | 0.02 | 0.02 | 0.02 | 0.02 | 0.02 |
| FC Material | 9:1 Z:TT | 9:1 Z:TT | 9:1 Z:TT | 9:1 Z:TT | Z | Z | Z |
| BC Material | PP | PP | PP | PP | 55:45 Z:PP | 55:45 Z:PP | 55:45 Z:PP |
| % IPA Wash | 40 | 40 | 40 | 40 | 50 | 50 | 50 |
| Diluent | 23 | 23 | 23 | 23 | 23 | 23 | 23 |
| D3O | 100 | 100 | 100 | 100 | 100 | 100 | 100 |

TABLE 10

| Example # | % Water | % Haze | DCA (degree) | $D_k$ | CT (µm) | Mechanicals Modulus (psi) | TS (psi) | Toughness | Elong. (%) | RI |
|---|---|---|---|---|---|---|---|---|---|---|
| Ex 27 | 24.9 | 4.9 | 60.6 | NM | NM | NM | NM | NM | NM | NM |
| Ex 28 | 24 | 7 | 55.8 | NM | NM | NM | NM | NM | NM | NM |
| Ex 29 | 22.6 | 15.8 | 38.4 | NM | 399 | 32562 | NM | NM | 9.2 | NM |
| Ex 30 | 21.5 | 26 | 37 | NM | 405 | 41181 | 2147 | 106 | 10.7 | 1.467 |
| Ex 31 | 20 | 19 | 56.4 | 199 | 370 | 57251 | 2469 | 156 | 12 | NM |
| Ex 32 | 25 | 141 | 34 | NM | 186 | 37983 | 1445 | 47 | 10 | 1.4464 |
| Ex 33 | 16.2 | 55 | 42.9 | 83 | NM | NM | NM | NM | NM | NM |
| Ex 34 | 17.7 | 63 | 36.4 | NM | NM | NM | NM | NM | | |
| Ex 35 | 20.8 | 13 | 38 | NM | 297 | 32267 | 1331 | 60.2 | 8.5 | 1.464 |
| Ex 35 flats | NM | NM | NM | NM | 288 | 32267 | 1331 | 60.2 | 8.5 | NM |
| Ex 36 | 17.1 | 44 | 32.7 | NM | 276 | 61629 | 2521 | 98.6 | 8.5 | 1.472 |
| Ex. 36 flats | NM | NM | NM | NM | 292 | 53600 | 1989 | 56.3 | 8.5 | NM |
| Ex 37 | 20.3 | 20 | 35.3 | NM | 290 | 56333 | 2339 | 90.7 | 9 | 1.467 |
| Ex. 37 flats | NM | NM | NM | NM | 299 | 46901 | 1956 | 61.2 | 8.9 | NM |
| Ex 38 | 18.3 | 20 | 39 | | 286 | 53690 | 2145 | 79.1 | 8.8 | 1.467 |
| Ex. 38 flats | | | | | 289 | 42899 | 1589 | 40.8 | 8.6 | |

Silicone hydrogels having moduli in excess of 60,000 psi but still displaying water contents of 15 to about 25% were produced. The silicone hydrogels displayed desirable haze, Dk and contact angles.

Examples 43-52

Each reactive mixture was formed by mixing the reactive components listed in Table 11 and then degassed by applying vacuum at ambient temperature for about 20 minutes. In a glove box with a nitrogen gas atmosphere and less than 0.1 percent oxygen gas, about 100 µL of the reactive mixture was then dosed at room temperature into the FC made from Zeonor. The BC made from 55:45 (w/w) blend of Zeonor:polypropylene was then placed on the front curve mold. The molds were equilibrated for a minimum of twelve hours in the glove box prior to dosing. The tray was transferred into an adjacent glove box maintained at 60-65° C., and the lenses were cured from the top for 20 minutes using 420 nm LED lights having intensity of 4-5 mW/cm².

The lenses were manually de-molded with most lenses adhering to the BC and released using 40% IPA overnight, followed by washing with 40% IPA 0.5 to 1 hour, two times with DI water for about 0.5 to 1 hour, and finally two times with borate buffered packaging solution for about 30 minutes. The lenses were sterilized by autoclaving at 122° C. for 30 minutes. The physical and mechanical properties of the sterile lenses were measured and are listed in Table 12.

and 50% IPA overnight, followed by washing two times with 40% IPA for about 0.5 to 1 hour, two times with DI water for about 0.5 to 1 hour, and finally two times with borate buffered packaging solution for about 30 minutes, and finally two times with borate buffered packaging solution for about 30 minutes. The lenses were sterilized by autoclaving at 122° C. for 30 minutes. The physical and mechanical properties of the sterile lenses of Examples 53-56 were measured and are listed in Table 14.

TABLE 11

| Component | Ex 43 | Ex 44 | Ex 45 | Ex 46 | Ex 47 | Ex 48 | Ex 49 | Ex 50 | Ex 51 | Ex 52 |
|---|---|---|---|---|---|---|---|---|---|---|
| Styryl TRIS | 42.8 | 42.8 | 42.8 | 42.8 | 42.8 | 42.8 | 42.8 | 42.8 | 42.8 | 42.8 |
| NMMA | 15 | 15 | 15 | 12 | 9 | 15 | 15 | 15 | 15 | 15 |
| HEMA | 16.64 | 13.64 | 10.64 | 10.64 | 16.64 | 10.64 | 10.64 | 10.64 | 10.64 | 10.64 |
| DMA | 3 | 6 | 9 | 12 | 9 | 9 | 9 | 9 | 9 | 9 |
| PVP K90 | 7 | 7 | 7 | 7 | 7 | 7 | 7 | 7 | 7 | 7 |
| Tegomer 2250 | 10.2 | 10.2 | 10.2 | 10.2 | 10.2 | 10.2 | 10.2 | 10.2 | 10.2 | 10.2 |
| EGDMA | 3 | 3 | 3 | 3 | 3 | 3 | 3 | 3 | 3 | 3 |
| Norbloc | 2 | 2 | 2 | 2 | 2 | 2 | 2 | 2 | 2 | 2 |
| CGI 1870 | 0.34 | 0.34 | 0.34 | 0.34 | 0.34 | 0.34 | 0.34 | 0.34 | 0.34 | 0.34 |
| Blue HEMA | 0.02 | 0.02 | 0.02 | 0 | 0.02 | 0.02 | 0.02 | 0.02 | 0.02 | 0.02 |
| Diluent | 23 | 23 | 23 | 23 | 23 | 20 | 25 | 30 | 35 | 40 |
| D3O | 100 | 100 | 100 | 100 | 100 | 100 | 100 | 100 | 100 | 100 |

TABLE 12

| Ex # | % Water | % Haze | Sessile Drop (°) | Dk | CT (µm) | Mechanicals | | | | RI |
|---|---|---|---|---|---|---|---|---|---|---|
| | | | | | | Modulus (psi) | TS (psi) | Toughness | Elong. (%) | |
| Ex 43 | 16 | 71 | 44.9 | 83 | 187 | 60219 | 2212 | 63.5 | 9.1 | 1.4713 |
| Ex 44 | 17 | 83 | 64.4 | 93 | 177 | 58448 | 2173 | 61 | 9.6 | 1.4722 |
| Ex 45 | 23 | 90 | 46.6 | NM | 184 | 58232 | 1996 | 61 | 9.6 | 1.4720 |
| Ex 46 | 22 | 94 | 60.9 | 96 | 169 | 40827 | 1454 | 39.8 | 10 | 1.4685 |
| Ex 47 | 19 | 64 | 50.4 | 109 | 188 | 43687 | 1919 | 63.3 | 10.2 | 1.4701 |
| Ex 48 | 20 | 10 | 25.7 | NM | 207 | 27958 | 1087 | 37.8 | 9.8 | 1.4591 |
| Ex 49 | 20 | 14 | 25.2 | NM | 212 | 27514 | 1067 | 35.8 | 9.9 | 1.4609 |
| Ex 50 | 19 | 45 | 30.5 | NM | 215 | 25849 | 1004 | 31.7 | 9.1 | 1.4568 |
| Ex 51 | 21 | 52 | 29.8 | NM | 177 | 27993 | 1102 | 39.4 | 9.7 | 1.4512 |
| Ex 52 | 19 | 18 | 31.6 | NM | 170 | 30335 | 1064 | 34.7 | 12.3 | 1.4532 |

Examples 53-57

Each reactive mixture was formed by mixing the reactive components listed in Table 13 and then degassed by applying vacuum at ambient temperature for about 20 minutes. In a glove box with a nitrogen gas atmosphere and less than 0.1 percent oxygen gas, about 100 µL of the reactive mixture was then dosed at room temperature into the FC made from Zeonor. The BC made from a 55:45 (w/w) blend of Zeonor:polypropylene was then placed on the front curve mold. The molds were equilibrated for a minimum of twelve hours in the glove box prior to dosing. The tray was transferred into an adjacent glove box maintained at 60-65° C., and the lenses were cured from the bottom for 20 minutes using TL03 lights having intensity of 4-5 mW/cm².

The lenses were manually de-molded with most lenses adhering to the BC and released using 40% IPA overnight

TABLE 13

| Component | Ex 53 | Ex 54 | Ex 55 | Ex 56 | Ex 57 |
|---|---|---|---|---|---|
| Styryl TRIS | 42.8 | 44.8 | 44.3 | 43.8 | 42.8 |
| NMMA | 15 | 15 | 15 | 15 | 15 |
| HEMA | 17 | 16.98 | 16.98 | 16.98 | 16.98 |
| pVMA (507 KDa) | 10 | 10 | 10 | 10 | 10 |
| Tegomer 2250 | 10.2 | 10.2 | 10.2 | 10.2 | 10.2 |
| EGDMA | 3 | 1 | 1.5 | 2 | 3 |
| Norbloc | 1.75 | 1.75 | 1.75 | 1.75 | 1.75 |
| CGI 819 | 0.25 | 0.25 | 0.25 | 0.25 | 0.25 |
| Blue HEMA | 0 | 0.02 | 0.02 | 0.02 | 0.02 |
| Diluent | 23 | 30 | 30 | 30 | 30 |
| 3E3P | 100 | 100 | 100 | 100 | 100 |

TABLE 14

| Ex # | % Water | % Haze | Sessile Drop (°) | CT (μm) | Mechanicals | | | |
|---|---|---|---|---|---|---|---|---|
| | | | | | Modulus (psi) | TS (psi) | Toughness | Elong. (%) |
| Ex 53 | 29 | 370 | 41.6 | 446 | 30106 | 1249 | 57.1 | 10.8 |
| Ex 54 | 29 | 230 | 38 | 452 | 32991 | 1517 | 53.8 | 10.5 |
| Ex 55 | 26 | 101 | 34.7 | 461 | 30656 | 1333 | 40.3 | 8.6 |
| Ex 56 | 21 | 43 | 34.8 | 400 | 42900 | 1978 | 83.9 | 10.1 |

The silicone hydrogels of Examples 53-56 display moduli up to 43,000 psi, and water contents between about 20 and 30%.

Example 58

Each reactive mixture was formed by mixing the reactive components, filtering through a 3 μm filter using a heated or unheated stainless steel or glass syringe, and then degassed by applying vacuum at ambient temperature for about 10-20 minutes. In a glove box with a nitrogen gas atmosphere and less than 0.1 percent oxygen gas, about 20 μL to about 35 μL of the degassed reactive mixture from Example 31 were dosed at 60-65° C. into the FC made from a 55:45 (w/w) blend of Zeonor:polypropylene. The actual volume was used to control the optical zone. The FC was then irradiated for 2 minutes under 420 nm LED lights having an intensity of 4-5 mW/cm$^2$ producing a partially cured gel. Thereafter, about 125 μL of the degassed reactive mixture from Table 15 was dosed into the FC on top of the aforementioned partially cured gel. A BC made from Zeonor was placed on the front curve mold. The molds were equilibrated for a minimum of twelve hours in the glove box prior to dosing. The lenses were cured from the bottom for 18 minutes using 420 nm LED lights having intensity of 4-5 mW/cm$^2$. It was important to control the kinetics of the copolymerization during each stage so that a coherent interphase or transition zone was formed between the central and peripheral regions of the resulting contact lens.

The lenses were solvent released from the molds by the following method which prevented any damage to the lenses because of the differences in the two formulations: (1) suspended in 20% IPA overnight, 20% IPA for one hour, 30% IPA for 2-4 hours, 40% IPA overnight, 30% IPA for 2-4 hours, 20% IPA overnight, and finally DI water overnight. The lenses were sterilized by autoclaving at 122° C. for 30 minutes.

The properties for the hydrogel used in the peripheral and central zones are listed in Table 16, below. The resulting contact lens was evaluated for astigmatic masking using an in vitro test method in which the contact lens is fitted on an eye model and optical coherence tomography (OCT) was used to generate an image of the contact lens on the model eye. In FIG. 1, an OCT image demonstrating that the contact lens prepared in Example 57 was able to vault over the corneal region of the eye model thereby providing a gap filled with artificial tear fluid that from an optics point of view masks astigmatism on the cornea.

TABLE 15

| Component | peripheral reactive mixture |
|---|---|
| OH-mPDMS n = 4 | 10 |
| OH-mPDMS n = 15 | 50 |
| DMA | 10 |
| HEMA | 10.98 |
| pVMA (507 KDa) | 7 |
| Tegomer 2250 | 10 |
| Norbloc | 1.75 |
| CGI 819 | 0.25 |
| Blue HEMA | 0.02 |
| Diluent | 23 |
| D3O | 100 |

TABLE 16

| Zone | Sessile drop | % water | % haze | Mechanical Properties | | | |
|---|---|---|---|---|---|---|---|
| | | | | Mod (psi) | Elong (%) | TS (psi) | Toughness |
| Central | 37 (8) | 22 (0) | 26 (2) | 41181 (2385) | 11 (1) | 2148 (149) | 106 (26) |
| Periph. | 65 (6) | 24 (0) | 5 (0) | 178 (12) | 158 (42) | 129 (29) | 116 (53) |

Although the invention herein has been described with reference to particular examples, it is to be understood that these examples are merely illustrative of the principles and applications of the present invention. It will be apparent to those skilled in the art that various modifications and variations can be made to the compositions, methods and apparatus of the present invention without departing from the spirit and scope of the invention. Thus, it is intended that the present invention include modifications and variations that are within the scope of the appended claims and their equivalents.

What is claimed is:

1. A composite contact lens comprising a central region and a peripheral region wherein the central region comprises a first silicone hydrogel having a modulus between about 10,000 psi and about 200,000 psi and a water content of at least about 10%, formed from a reactive mixture comprising at least one N-alkyl methacrylamide, at least one silicone-containing component, and at least one silicone cross-linking agent containing between 5 and 200 siloxane repeat units; and the peripheral region comprising a second silicone hydrogel exhibiting a modulus between about 50 psi and about 300 psi.

2. The composite contact lens of claim 1 wherein the first silicone hydrogel comprises a water content of about 20 to about 40%.

3. The composite contact lens of claim 1 wherein the reactive mixture further comprises at least one photoinitiator.

4. The composite contact lens of claim 3 wherein said first silicone hydrogel is cured via exposure to light.

5. The composite contact lens of claim 1 wherein said silicone containing component comprises at least one silicone chain having 3-30 siloxane repeating units.

6. The composite contact lens of claim 5 wherein said at least one silicone chain is a polydialkyl siloxane chain.

7. The composite contact lens of claim 5 wherein said at least one silicone chain is a polydimethyl siloxane chain.

8. The composite contact lens of claim 5 wherein said at least one silicone chain is a polydiaryl siloxane chain.

9. The composite contact lens of claim 1 wherein said reactive mixture comprises about 20 to about 60 wt % of said silicone containing component, based upon all reactive components.

10. The composite contact lens of claim 1 wherein said reactive mixture comprises about 5 wt % to about 50 wt % of at least one N-alkyl methacrylamide, based upon all reactive components.

11. The composite contact lens of claim 1 wherein said silicone-containing component is selected from compounds of Formulae I through V, and combinations thereof:

not required; wherein j is a whole number between 1 and 20; q is 1 to 50; and $n^1$ and $n^2$ are between 4 to 100; $n^3$ is 1-50;

wherein $R^2$ is H or is a linear, branched, or cyclic alkyl group containing one to eight carbon atoms, any of which may be further substituted with at least one hydroxy group, and which may be optionally substituted with amide, ether, and combinations thereof;

wherein $R^3$ is a substituted or unsubstituted C1-6 alkylene segment of formula $(CH_2)_r$ where each methylene group is optionally independently substituted with ethers, amines, carbonyls, carboxylates, carbamates and combinations thereof; or an oxyalkylene segment $(OCH_2)_k$ and k is a whole number from one to three, or wherein $R^3$ may be a mixture of alkylene and oxyalkylene segments and the sum of r and k is between 1 and 9;

wherein each $R^4$ is independently a linear, branched, or cyclic alkyl group containing between one and six carbon atoms, a linear, branched, or cyclic alkoxy group containing between one and six carbon atoms, a linear or branched polyethyleneoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof;

wherein $R^5$ is a substituted or un-substituted linear or branched alkyl group having 1 to eight carbon atoms; or an aryl group, any of which may be substituted with one or more fluorine atoms.

Formula I

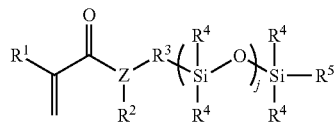

Formula II

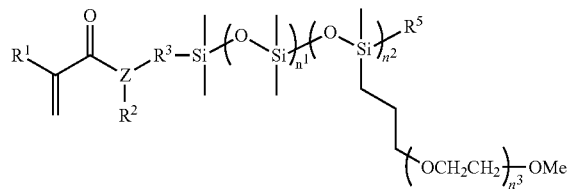

Formula III

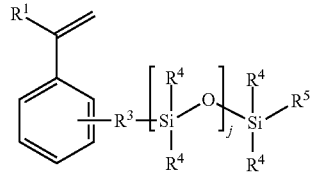

Formula IV

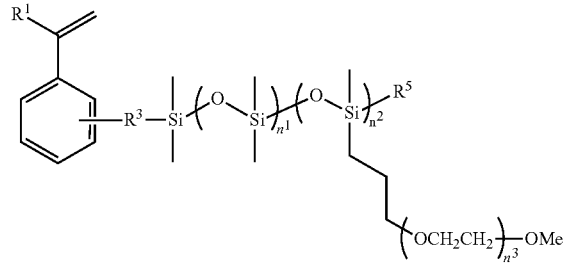

Formula V

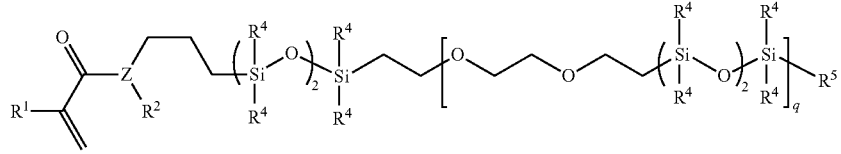

wherein $R^1$ is a hydrogen atom or methyl; Z is selected from O, N, S or $NCH_2CH_2O$; when Z=O or S, $R^2$ is 12. The composite contact lens of claim 1 wherein said N-alkyl methacrylamide is N-methyl methacrylamide.

13. The composite contact lens of claim 1 wherein said reactive mixture comprises about 7 to about 30 wt % of at least one N-alkyl methacrylamide, based upon all reactive components.

14. The composite contact lens of claim 1 wherein the first silicone hydrogel further comprises at least one toughening agent.

15. The composite contact lens of claim 14 wherein the toughening agent is selected from the group consisting of methyl methacrylate, tert-butyl methacrylate, isobornyl methacrylate, cyclohexyl methacrylate, styrene, substituted styrenes, N-4-vinylbenzyl-N-alkyl acetamides, N-4-vinylbenzyl pyrrolidone, and mixtures thereof.

16. The composite contact lens of claim 1 wherein the first and second silicone hydrogels comprise water contents within about 5 weight percent of one another.

17. The composite contact lens of claim 1 wherein the central region is encapsulated by the peripheral region.

\* \* \* \* \*